United States Patent [19]
Baji et al.

[11] Patent Number: 5,426,745
[45] Date of Patent: Jun. 20, 1995

[54] APPARATUS INCLUDING A PAIR OF NEURAL NETWORKS HAVING DISPARATE FUNCTIONS COOPERATING TO PERFORM INSTRUCTION RECOGNITION

[75] Inventors: Toru Baji, Burlingame, Calif.; Kouki Noguchi, Kokubunji, Japan; Tetsuya Nakagawa, Millbrae, Calif.; Motonobu Tonomura, Kodaira, Japan; Hajime Akimoto, Mobara; Toshiaki Masuhara, Tokyo, Japan

[73] Assignee: Hitachi, Ltd., Tokyo, Japan

[21] Appl. No.: 206,195

[22] Filed: Mar. 3, 1994

Related U.S. Application Data

[63] Continuation of Ser. No. 934,723, Aug. 24, 1992, abandoned, which is a continuation of Ser. No. 567,010, Aug. 14, 1990, Pat. No. 5,163,111.

[30] Foreign Application Priority Data

Aug. 18, 1989 [JP] Japan .................................. 1-211320

[51] Int. Cl.$^6$ .............................................. G06F 15/18
[52] U.S. Cl. ...................................... 395/375; 395/22; 395/2; 364/DIG. 1; 364/DIG. 2; 364/284.4; 364/972.4; 382/159
[58] Field of Search ................... 364/DIG. 1 MS File, 364/DIG. 2 MS File, 513; 395/1, 2, 3, 4, 5, 6, 7, 8, 9, 10, 11, 12, 13, 14, 15, 20, 21, 22, 100, 155, 200, 250, 275, 325, 375, 650, 700, 800; 381/15, 41, 44, 42, 43, 45, 51, 52, 110; 382/14, 15, 22

[56] References Cited

U.S. PATENT DOCUMENTS 4,776,016 10/1988 Hansen .................................. 381/42
5,163,111 11/1992 Baji et al. .............................. 395/22

OTHER PUBLICATIONS

Obermeier et al., "Time to Get Fired Up.", Byte Magazine (Aug. 1989) pp. 217–220, 222–224.

Lisa Gunn, "Chips Try Teaching Computers to Speak, Listen.", Electronic Design (May 25, 1989) pp. 33, 34, 36.

Teuyo Kohonen, "The 'Neural' Phonetic Typewriter", IEEE Computer (mar. 1988) pp. 11–22.

Cun et al. "Handwritten Digit Recognition Applications of Neural Network Chips and Automatic Learning.", IEEE Communications Magazine (1989) pp. 41–46.

MacIntosh SE Manual, Apple Computer Japan, pp. 88–93, 144–147, and 156–157. (Provided in Japanese).

"Speech Recognition Using Neural Net Discriminated 70% of Consonants Which Have Been Recognized Incorrectly Heretofore", NE Report, Nikkei Electronics, Nov. 14, 1988, pp. 102–103. (Japanese).

James Hutchinson, et al., "Use of Neural Net in Pattern Processing, Signal Processing and Knowledge Processing", Nikkei Electronics, Aug. 10, 1988, pp. 171–185. (Japanese).

(List continued on next page.)

*Primary Examiner*—Robert B. Harrell
*Attorney, Agent, or Firm*—Fay, Sharpe, Beall, Fagan, Minnich & McKee

[57] ABSTRACT

There is provided a customized personal terminal device capable of operating in response to input data peculiar to the operator, comprising a speech recognition unit for recognizing inputted speech, an image recognition unit for recognizing inputted image, and an instruction recognition unit for recognizing an inputted instruction. Neural networks respectively provided in at least two of the speech, image and instruction recognition units, a bus operatively connected to the respective recognition units, a processor operatively connected to the bus to perform processing upon the speech, and image and instruction recognized by the recognition units. Also, memory is operatively connected to the bus, and a control unit exercises control over information exchange between respective recognition units and the memory under the control of the processor.

14 Claims, 23 Drawing Sheets

OTHER PUBLICATIONS

Analog VLSI Implementation of Neural Systems; Chapter 9; pp. 213–238; 1989; Kluwer Academic Publishers.

An Application of Neural Net Chips: Handwritten Digit Recognition; Jackel, et al.; IEEE Inter. Conf. on Neural Network; Jul. 1988; pp. II107–115.

DETE: Connection/Symbolic Model of Visual and Verbal Association; Nenov, et al; IEEE Inter. Conf. on Neural Networks; Jul. 1988; pp. II17–24.

Cellular Neural Networks: Applications; Chua et al; IEEE Trans. on Circuits & Systems; vol. 35, No. 10; Oct. 1988, pp. 1273–1290.

Design of Parallel Hardware Neural Network Systems from Custom Analog VLSI 'Building Block' Chips; Eberhardt et al; IJCNN; Jun. 18–22, 1989; vol. 2; pp. 183–190.

Integration of Acoustic and Visual Speech Signal Using Neural Networks; Yuhas et al; IEEE Communications Magazine; Sep. 1989; pp. 65–71.

The Cognitive Challenge for Neural Architectures; Aleksander et al; Inter. Neural Network Conf.; Jul. 1990; pp. 627–630.

F I G. 6
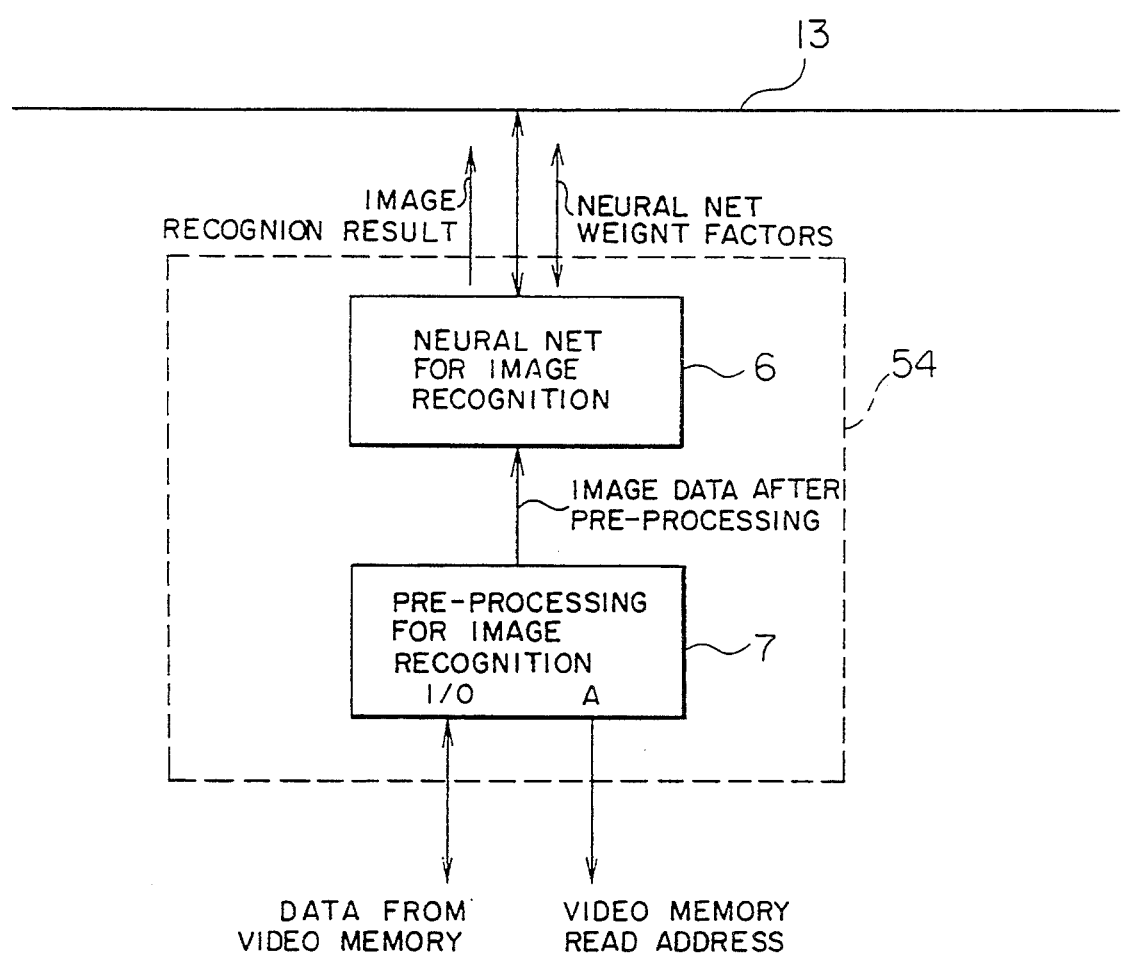

FIG. 18A

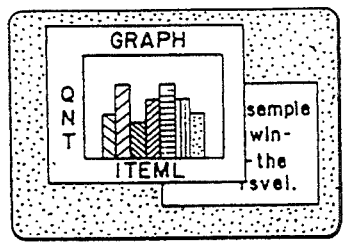

FIG. 18B

Save this graph as graph1 in the folder graphs on CD.
INSTRU-   OBJECT   FILE NAME   HIERARCHICAL   STORAGE
CTION    TO BE     IN STORAGE   FOLDER NAME    MEDIUM
          STORED                           OF STORAGE
                                           DESTINATION

FIG. 18C

TERMINAL USER : Sabe !
TERMINAL : Do you want to save ?
TERMINAL USER : Yes.
TERMINAL : What do you want to save ?
TERMINAL USER : This graph.
TERMINAL : What is the file name for this graph ?
TERMINAL USER : Graph 1.
TERMINAL : To which media do you want to save ?
TERMINAL USER : CD.
TERMINAL : Do you want to save to any specific folder ?
TERMINAL USER : Yes.
TERMINAL : What is the name of the folder ?
TERMINAL USER : Graphs.
TERMINAL : Command completed.
           Let me repeat the full command.
           Save this graph as graph1 in the folder graphs on CD.
           Is this command right ?
TERMINAL USER : Yes.
TERMINAL : Command proceeded.

APPARATUS INCLUDING A PAIR OF NEURAL NETWORKS HAVING DISPARATE FUNCTIONS COOPERATING TO PERFORM INSTRUCTION RECOGNITION

This is a continuation of U.S. application Ser. No. 07/934,723 filed Aug. 24, 1992, abandoned, which is a continuation of U.S. application Ser. No. 07/567,010 filed Aug. 14, 1990, now U.S. Pat. No. 5,163,111.

CROSS-REFERENCE OF RELEVANT PATENT APPLICATION

The present application relates to U.S. patent application Ser. No. 455,141, now U.S. Pat. No. 5,091,864, entitled "NEURAL NET SIGNAL PROCESSOR" filed on Dec. 21, 1989 in the name of T. Baji et al.

BACKGROUND OF THE INVENTION

The present invention relates to a terminal device such as a word processor, a personal computer, a work station, or a computer, and in particular to a customised personal terminal device so individualized as to deal with the feature of an individual user such as manipulation likes peculiar to the user, the user's voice and handwriting characteristics, and a terminal device for making such a terminal device portable.

Conventional man-machine interfaces are described in (1) "Machintosh manual", "Machintosh SE", Apple Corp., USA.
(2) "Speech recognition using neural net discriminates 70% of consonants which have been recognized incorrectly heretofore", NE report, Nikkei Electronics, Nov. 14, 1988.
(3) "Use of neural net in pattern processing, signal processing and knowledge processing", Nikkei Electronics, Aug. 10, 1988.

A terminal having the most advanced man-machine interface was heretofore Machintosh described in the aforementioned literature (1). As described in the manual, this terminal makes it possible to set basic manipulation environments such as kana (Japanese syllabary)/romaji (a method of writing Japanese in Roman characters) key setting, kanji (Chinese character) code inputting method, cursor flashing speed, mouse response speed, file display mode, speaker volume and printing and communication port setting so as to satisfy the user's likings. Further, it is also possible to carry the above described manipulation parameters by using a floppy disk as a medium and apply those parameters to another Machintosh terminal.

On the other hand, speech recognition using the neural net, recitation of text data, character recognition and other techniques are now being developed individually.

The recognition rate can be improved by using the neural net as described above. As reported in the aforementioned literature (2), for example, approximately 70% of consonants which have heretofore been recognized incorrectly can be correctly recognized.

Further, by using Neural net having a learning function, it becomes possible to make terminals learn chracteristics of recognition or text synthesis (recitation of text data by using synthesized speech). In NET talk described in the aforementioned literature (3), for example, the terminal learns a proper pronunciation method of text data by using a document containing approximately 1,000 words picked from a book for pronunciation practice of children, 20,000 words picked from a Webster dictionary, and proper phonetic symbols corresponding to them. As a result, accuracy of pronunciation amounts to 95% after 50 learning attempts.

SUMMARY OF THE INVENTION

In the prior art as seen in Machintosh of the aforementioned literature (1), data input must be performed by still using a keyboard or a mouse. Character recognition function is not provided for speaking or speech recognition. The prior art is user-friendly. When an incorrect instruction (i.e., an instruction which is not in conformity with the format) is inputted, however, the instruction is not accepted or only a message that the instruction is incorrect is issued. This results in a problem that flexible error handling cannot be accomplished.

Further, speech recognition using the neural net, text data recitation and other techniques have been developed respectively individually, organic function in one terminal being prohibited. Therefore, it is not considered at all that image information such as lip movement is combined with speech in order to improve the recognition rate. Further, it is impossible that input is performed by speech and the instruction is confirmed by means of text synthesis tones.

Further, there is not a simple carrying unit for carrying the weight factors of the neural net and applying them to another terminal. There were many problems.

An object of the present invention is to provide a customised personal terminal device free from the above described drawbacks of the prior art terminals and having high-performance man-machine interface function by using neural networks in at least two speech recognition units, an image recognition unit and an instruction recognition unit and combining them organically.

Another object of the present invention is to provide such a customised personal terminal device that manipulates parameters peculiar to a terminal operator so that weight factors of a Neural network can be simply carried to another terminal.

Still, another object of the present invention is to provide a customised personal terminal device having function of self-learning manipulation parameters peculiar to the terminal operator.

In order to achieve the above described objects, a customised personal terminal device according to the present invention comprises a speech recognition unit for recognizing inputted speech, an image recognition unit for recognizing an inputted image, an instruction recognition unit for recognizing an inputted instruction, neural networks respectively provided in at least two of the above described speech, image and instruction recognition units, bus units operatively connected to the above described respective recognition units, and processor units operatively connected to the above described bus units to perform processing upon the speech: Also image and instruction respectively recognized by the above described recognition units, memory units operatively connected to the above described bus units, and a control unit for exercising control over information exchange between the above described respective recognition units and the above described memory units under the control of the above described processor units.

Owing to such configuration, memories holding weight factors (and knowledge base) of respective neural nets can be made accessible to a processor (such as a host CPU or a peripheral CPU).

In accordance with an aspect of the present invention, the above described learning function is achieved by providing a unit for supplying sample data stored in a memory unit comprising an optical disk or a magnetic disk as a storage medium to any one of the recognition units and for comparing the above described sample data with expectation of recognition result stored in the same storage medium or a different storage medium to adjust weight factors of the neuroprocessor for recognition.

Owing to the above described configuration, recognition can be performed more accurately.

In accordance with another aspect of the present invention, a terminal device comprises a unit for selectively supplying speech of the terminal user, speech of the other party supplied via a communication line, and speech recorded on the storage medium to the speech recognition unit incorporating the neural net.

Owing to the above described configuration, this terminal can recognize not only the speech information of the terminal user but also external speech information and stored speech information.

In accordance with still another aspect of the present invention, a terminal device comprises a unit for supplying character data recognized by the image recognition unit to the speech recognition unit incorporating the neural net.

In accordance with yet another aspect of the present invention, a terminal device comprises a unit for performing recognition by combining speech information with image information.

The unit just described recognizes speech generated by the user on the basis of a combination of speech information of the user and image information of the user's lip. Owing to this configuration, the recognition result can be made more accurate.

In accordance with still yet another object of the present invention, a terminal device comprises a unit for down-loading weight factors of respective neuroprocessors (and knowledge base on a memory including manipulation environment parameters) to a carriable memory such as a memory card, and a unit for up-loading them from the memory card.

Owing to the above described configuration, it becomes possible to store weight factors (and manipulation environment parameters) into the memory card, carry them and transfer them to another terminal.

In accordance with a further aspect of the present invention, a terminal device comprises a unit for inhibiting weight factors (and knowledge base) of respective neuroprocessers from being read out or over written.

Owing to the above described configuration, there is no fear that necessary storage information will be erased through carelessness.

In accordance with a still further aspect of the present invention, a terminal device comprises a unit for making the terminal user confirm the correctness of recognition result.

Owing to the above described configuration, it becomes possible to make the recognition results accurate and perform successively recognition suited to individuality of the user by learning the recognition result.

In accordance with a yet further aspect of the present invention, a terminal device comprises a unit for transferring weight factors of the neuroprocessor (and manipulation environment parameters) to/from a memory such as a memory card, and the speech recognition unit, the memory card, a processor such as the peripheral CPU, and a part of a different memory are so configured as to be detachable, driven by battery, and carriable.

Owing to the above described configuration, it becomes possible to carry a part of the speech input unit and perform speech input at an arbitrary place.

BRIEF DESCRIPTION OF THE DRAWINGS

FIG. 6 is a block diagram of an embodiment of an image recognition block;

FIG. 18A is a diagram showing an example of a multiwindow terminal screen to be manipulated;

FIG. 18B is a diagram showing an example of a complete instruction format;

FIG. 18C is a diagram showing an example of instruction input by means of interactive processing;

DESCRIPTION OF THE PREFERRED EMBODIMENTS

The present invention will hereafter be described by referring to the accompanying drawings.

Figure 1:
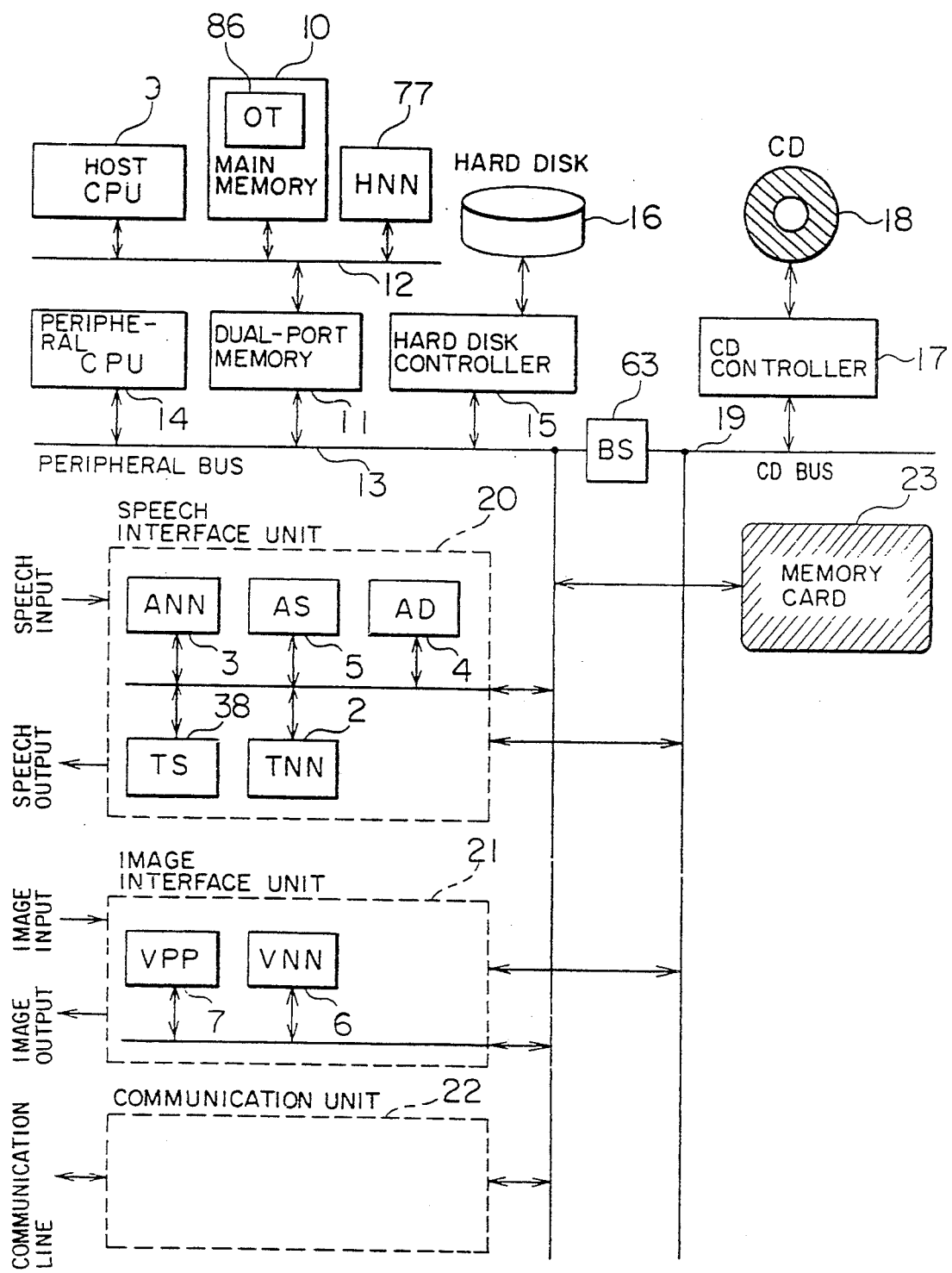
FIG. 1 is a block diagram showing the entire configuration of an embodiment of a customised personal terminal device according to the present invention.

FIG. 1 is a block diagram showing an embodiment of a personalised terminal according to the present invention.

With reference to FIG. 1, principal processing of a customised personal terminal device is performed by a host central processing unit (CPU) 9 and data and programs used by the host CPU 9 are held in a main memory device 10. The above described components are connected to a main bus 12. The main bus 12 is connected to a peripheral bus 13 via a dual-port memory 11. The above described dual-port memory 11 is used as a data buffer.

A peripheral CPU 14 for controlling peripheral circuits and a hard disk controller 15 are connected to the peripheral bus 13. Further, a CD (compact disk) 18 capable of storing a large amount of speech data and image data may be used. For that purpose, a CD controller 17 and a CD bus 19 may be installed. The CD is a writable one.

The configuration heretofore described is seen in the prior art terminal as well. In accordance with the present invention, however, an interface unit which will hereafter be described and a unit for storing manipulation and recognition parameters of the interface unit are added in order to provide an excellent man-machine interface.

That is to say, a speech interface unit 20 accepts and recognizes a natural voice supplied from the terminal user, input supplied from a communication line, or speech input recorded on the CD. By using a neural net 3 for phonemic feature extraction and a phonemic selection circuit 5 which will be described later, the speech interface unit 20 converts a speech waveform into a train of phonemes. Thereafter, the speech interface unit 20 converts the train of phonemes into significant text data (i.e., a train of words) by referring to a dictionary 4 for speech recognition (i.e., a data base indicating association of trains of phonemes with words). The result of this conversion is transferred to a neural net 77 for instruction recognition and the host CPU via the peripheral bus 13, the dual-port memory 11 and the main bus 12 and used for judgment of higher rank.

Further, in the present embodiment, consecutive text data inputted via the peripheral bus 13 are converted into speech. That is to say, text data are recited. For the purpose of the above described conversion, a data base for read/write conversion (not illustrated) is provided.

In an image interface unit 21, an inputted image undergoes processing such as noise reduction and border line extraction in a pre-processing processor 7 for image recognition and is then recognized as a character or a figure in a neural net 6 for image recognition. For the purpose of the above described recognition, a data base (not illustrated) indicating association of image patterns with their meanings is installed.

The result of recognition as characters is transferred to the speech interface unit 20 via the peripheral bus 13 and converted into significant text data (a train of words) by referring to a dictionary 4 for speech recognition of the speech interface unit 20. The result of this conversion is transferred to the host CPU via the peripheral bus 13 and used for judgment of higher rank.

A communication unit 22 is an interface unit for performing data communication with another terminal or computer via a communication line.

The phonemic selection circuit 5 and the pre-processing processor 7 for image recognition are connected to the host CPU and memories such as a memory card 23 via the peripheral bus 13. Therefore, weight factors of neural nets relating to man-machine interface and signal processing parameters (such as membership functions) of the phonemic selection circuit 5 and the pre-processing processor 7 for image recognition can be updated by the result of calculation processing performed in the host CPU 9 and the peripheral CPU 14 or down-loaded into a memory such as the memory card 23. Data stored in the memory card 23 or the like can be read out and the contents can be updated.

Respective components of the above described embodiment will hereafter be described in detail.

Figure 2:
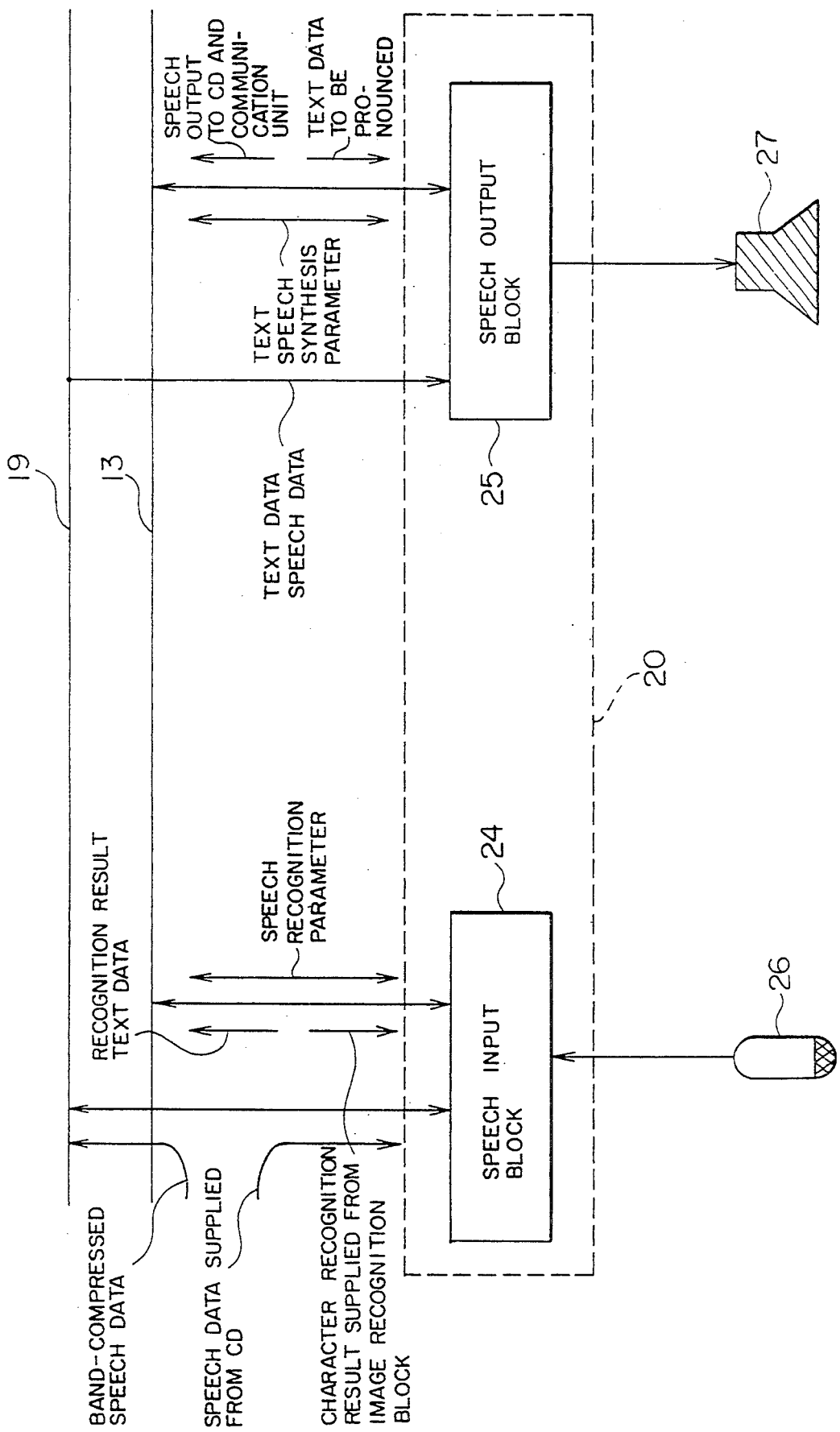
FIG. 2 is a block diagram of an embodiment of a speech interface unit.

FIG. 2 is a block diagram showing the schematic configuration of the speech interface unit 20.

With reference to FIG. 2, a speech input block 24 has function of recognizing the analog speech input inputted from a microphone 26, a speech communication signal transmitted from the communication unit 22 via the peripheral bus 13, or a speech signal recorded on the CD 18.

Text data obtained as a result of recognition performed in this block up to the stage of words are transferred to the host CPU via the peripheral bus 13 and used for recognition of higher rank.

Further, in the speech input block 24, it is also possible to digitize the analog speech input as it is and transmit it to the CD bus 19.

Further, character data recognized by an image recognition block 54 which will be described later are also inputted to the above described speech input block 24 and recognized as a word on the basis of contents of a word dictionary included in the speech input block 24.

A speech output block 25 receives text data (a train of words) to be outputted from the peripheral bus 13 or the CD bus 19, performs text speech synthesis, and transmits a speech output. The speech output block 25 drives a speaker 27 with a speech output converted into an analog signal and answers to a terminal user with speech. Further, a digital speech output is transferred to the CD 18 and the communication unit 22 and recorded as it is or conveyed to a terminal of the other party via a communication line.

Figure 3:
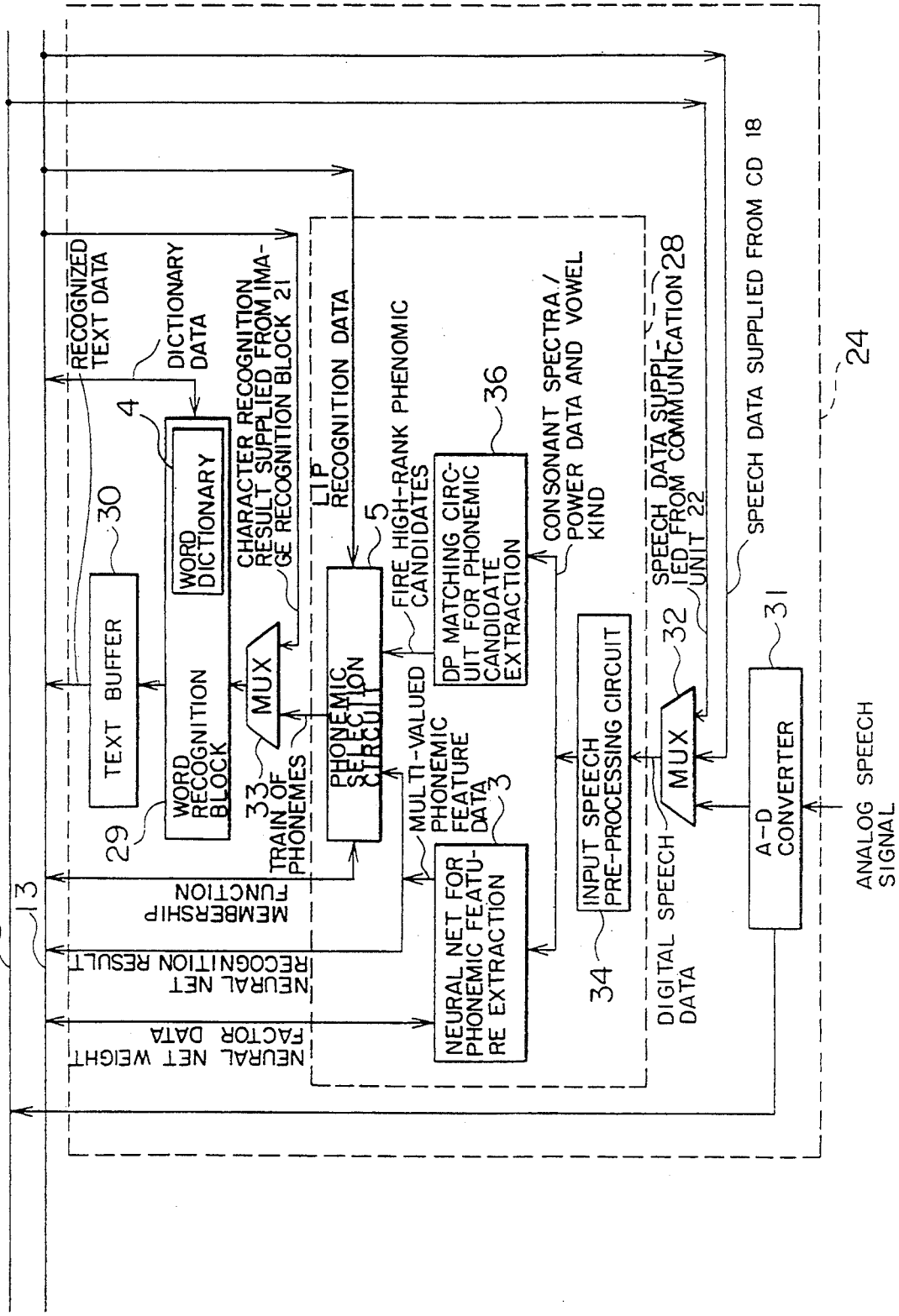
FIG. 3 is a block diagram of an embodiment of a speech input block.

FIG. 3 is a block diagram showing the configuration of the speech input block 24 in the present embodiment.

With reference to FIG. 3, a part for recognizing speech comprises a phonemic recognition block 28, a word recognition block 29 and a text buffer 30. This configuration is basically similar to that described in the aforementioned literature (2) "Speech recognition using neural net discriminates 70% of consonants which have been recognized incorrectly heretofore", NE report, Nikkei Electronics, Nov. 14, 1988.

In the above described phonemic recognition block 28, digital speech information is processed by an input speech pre-processing circuit 34. As for a vowel which can be easily processed, its kind is directly analyzed. As for a consonant which cannot be easily analyzed, its spectra (i.e., frequency components) and power are derived. Succeedingly from these data, up to, say, five high-rank phonemic candidates are selected by a DP (dynamic pattern) matching circuit 36 for phonemic candidate extraction. Further, by passing the same data through the neural net 3 for phonemic feature extraction, multi-valued phonemic feature data are obtained.

The neural net used here has a fixed structure and performs relatively low speed processing in the speech band. Among neuroprocessors disclosed in U.S. patent application Ser. No. 455,141, neuroprocessors each having a fixed data path to process a plurality of neurons or general-purpose processors including a DSP (digital signal processor) and an RISC (reduced instruction set computer) processor can be used.

The phonemic selection circuit 5 is a kind of fuzzy circuit responsive to multi-valued phonemic feature data outputted from the neural net 3 for selecting a correct phoneme out of phonemic candidates transmitted from the DP matching circuit 36 for phonemic candidate extraction. The criterion for candidate selection is set into a memory included in the DP matching circuit 36 as a membership function.

Further, in the present embodiment, the result of lip movement recognition performed in the image interface unit 21 is supplied to the input of the phonemic selection circuit 5, more accurate speech recognition being realized. The synchronization relation between the speech recognition and the image recognition which becomes important at this time such as the synchronization between the processing for recognizing speech "a" and the processing for recognizing lip movement of "a" is administered by the host CPU 9 or the peripheral CPU 14.

The above described train of phonemes (i.e., train of characters) outputted from the phonemic selection circuit 5 is transferred to the word recognition block 29 and recognized as a train of words on the basis of the word dictionary 4 included in the word recognition block 29. This train of words is outputted to the peripheral bus 13 via the text buffer 30.

The result of image recognition processed by the image interface unit 21 and selected by a multiplexer 33 is also supplied to the word recognition block 29 as its input. As a result, a train of characters which has been recognized as an image can also be organized into a word.

In addition to raw speech input of the terminal user inputted via an analog-digital (A-D) converter 31, digital speech data recorded on the CD 18 and speech of another person received by the communication unit 22 are also supplied to the phonemic recognition block 28 as its inputs. By using the latter, this terminal can be manipulated by speech supplied from a remote location.

Switching of the above described inputs is performed by a multiplexer 32.

Further, in the speech input block 24 of the present embodiment, it is also possible to record input speech data directly onto the CD 18.

It is a matter of importance that weight factors of the neural net, the membership function and dictionary data determining the property of speech recognition can be transmitted among the memory, the CPU and the speech interface unit because the speech input block 24 is connected to the host CPU 9, the peripheral CPU 14 or the memory card 23. It is thus possible to set result data of personal recognition (such as the above described weight factors, membership function and dictionary data) supplied from the memory such as the memory card into the speech interface unit or, on the contrary, down-load the same data supplied from the speech interface unit onto the memory such as the memory card.

In the above described embodiment, speech recognition is performed within the speech interface unit 20 by using the result of recognition performed in the image interface unit 21. By using results of recognition performed in both inferface units 20 and 21, however, synthetic recognition processing (such as deriving the product of both recognition results) may be performed in the CPU 9 or 14.

Further, image recognition processing in the image interface unit 21 may be performed by using the result of recognition performed in the speech interface unit 20.

Further, by using the host CPU, it is possible to make the neural net learn in accordance with an algorithm such as back propagation.

Figure 8:
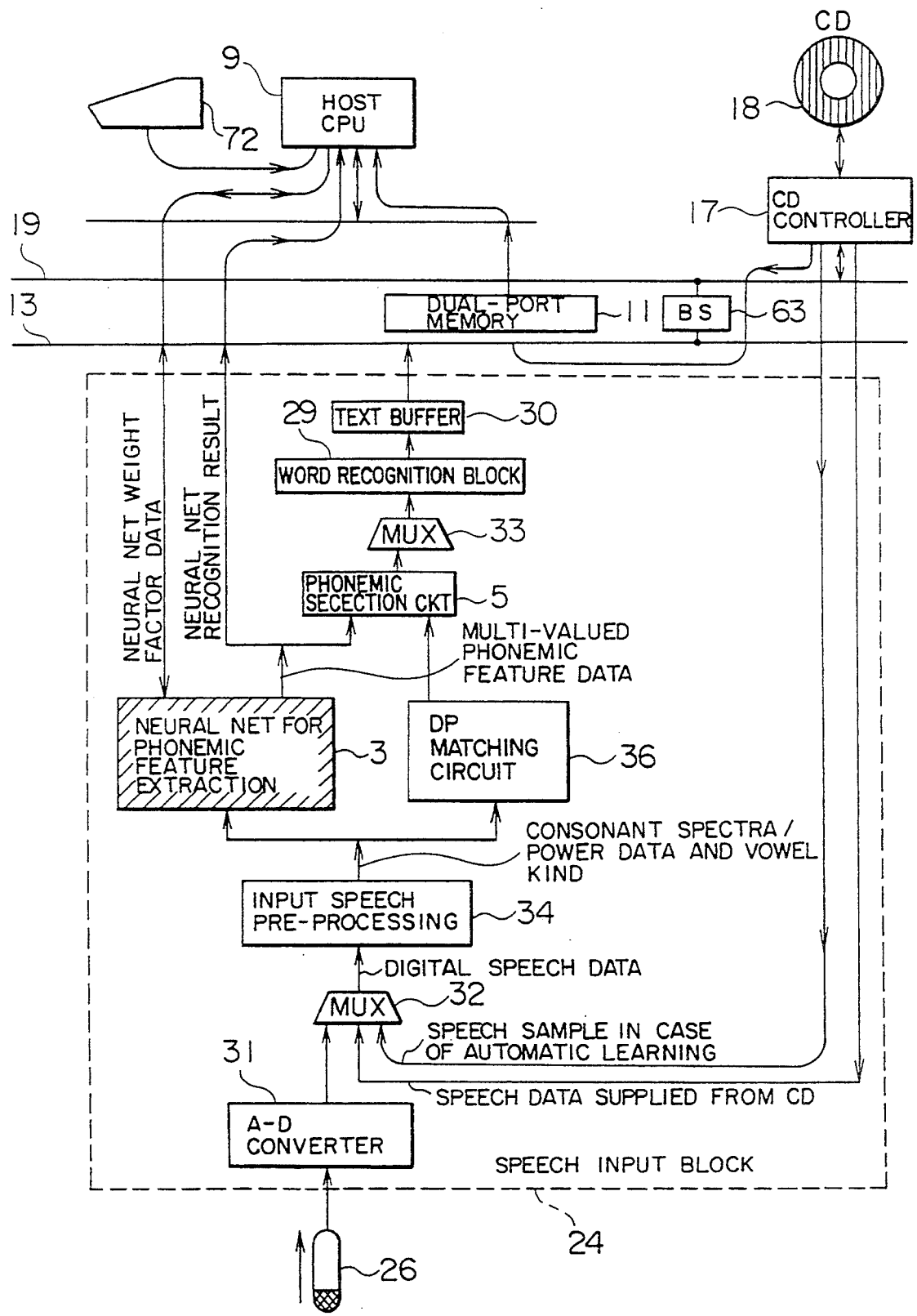
FIG. 8 is a diagram showing flow of a learning scheme of a neural net in the speech input block.

FIG. 8 is a diagram showing the data flow in case the above described learning of the speech recognition block is executed.

FIG. 8 shows the case where learning of the neural net 3 for phonemic feature extraction is performed.

As for the learning method, there are an automatic learning method and a manual learning method. In the former one, learning is automatically performed by using speech samples and neuro output expectation stored in the memory such as the CD 18. In the manual learning method, the terminal user inputs raw speech and executes learning in an interactive manner.

First of all, in the automatic learning, speech samples of the terminal user or the like stored in the CD 18 are inputted to the pre-processing circuit 34 via the multiplexer 32. The result of processing is inputted to the neural net 3.

The result of recognition performed in the neural net 3 is transferred to the host CPU 9 via the peripheral bus 13, the dual-port memory 11 and the main bus 12. At the same time, expectation of the neuro-output is inputted from the CD 18 to the host CPU. The host CPU compares these outputs and updates weight factors included in the neural net 3 in accordance with the learning algorithm based upon back propagation.

The speech recorded on the above described CD 18 may be consonant data which cannot be easily distinguished or may be recitation of a particular sample document by the terminal user.

Figure 14:
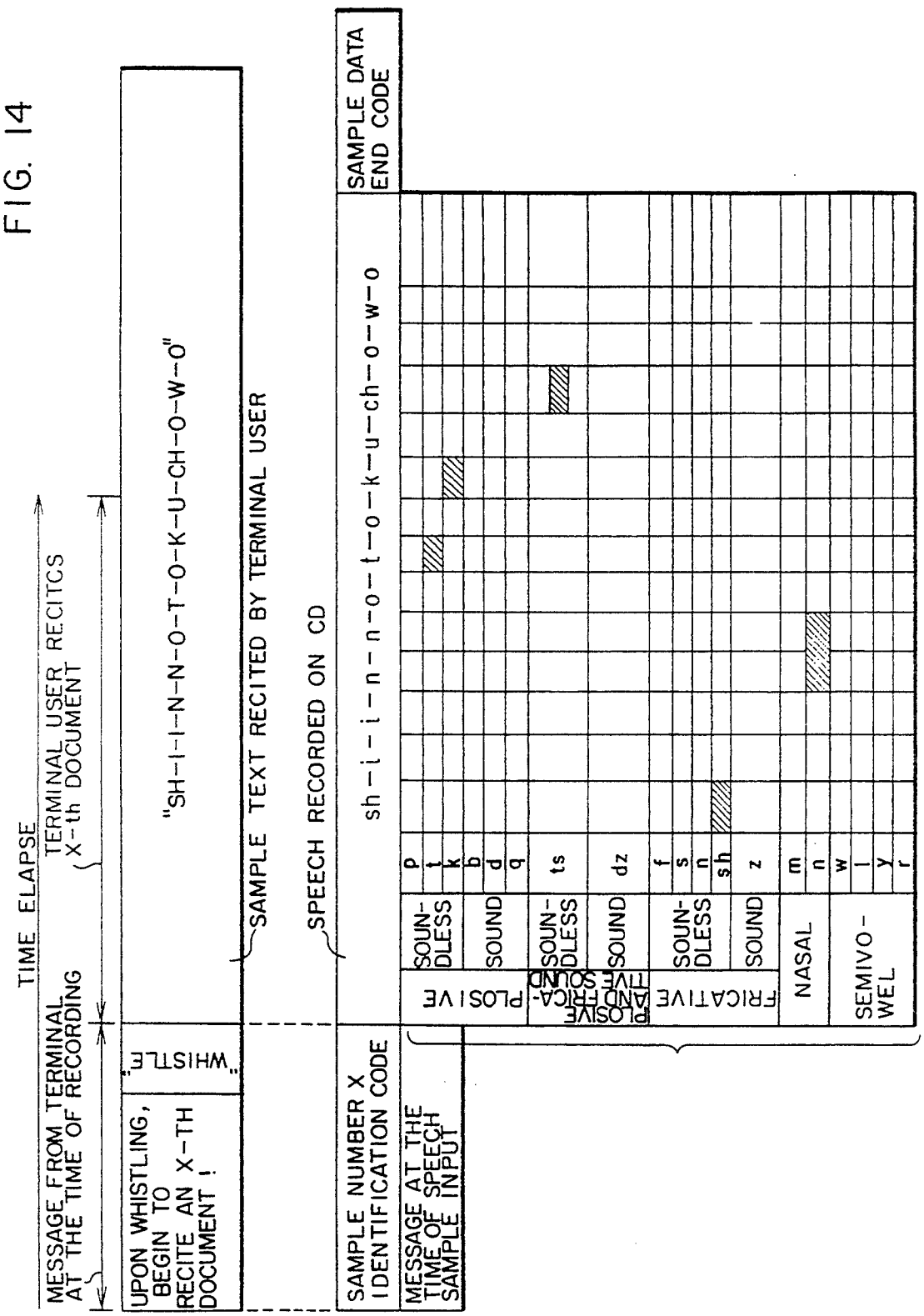
FIG. 14 is a diagram showing an example of format of learning data for speech recognition stored on a CD.

In case the terminal user recites a particular sample document and records it onto the CD beforehand through the microphone, the speech samples on the CD 18 and expectation of the neuro-output recorded onto the CD beforehand are already recorded onto the CD in accordance with a format shown in FIG. 14, for example. That is to say, a sample number identification code and then speech samples of the terminal user are recorded on one of stereo-channels, i.e., on the right (R) channel. Finally, a sample data end code is automatically inserted. On the other hand, a sample document (i.e., output expectation of the neural net corresponding to the sample speech) is originally recorded on the left (L) channel in the wake of a message obtained at the time of speech sample input. In FIG. 14, shaded phonemes are expected.

With reference to FIG. 14, an expectation code is assigned to one division of every phoneme for clarity. However, an actual expectation code is represented by multiple values. For a vague phoneme, a value is assigned to a plurality of phonemes in some cases.

Further, recorded speech data need not be strictly in synchronism with change timing of each phoneme of the neural net expectation. Data arrangement need only be matched. This is because the input speech pre-processing circuit 34 included in the speech input block 24 detects a gap between phonemes, in synchronism with which the host CPU 9 controls the CD 18 and neural net expectation data read out from the CD 18 are suitably delayed to achieve synchronization.

At the time of learning, the host CPU repeatedly learns until the error between the output of the neural net 3 and the neural net expectation supplied from the CD 18 comes within a prescribed value. Weight factors obtained when the error comes within the prescribed value are held in the neural net 3.

When a speech sample for learning is inputted, the following message requesting input is first spoken. As described before, the message is recorded beforehand in the L channel of the CD 18.

"Upon whistling, begin to recite an X-th document."
or
"Upon whistling, repeat the following composition. sh-i-i-n-n-o-t-o-k-u-ch-o-w-o - - - ."

In the former case, the composition to be recited is displayed on a CRT 61. That is to say, code data of sample compositions are also recorded onto the CD 18.

In case of manual learning, natural voices of the terminal user are inputted to the speech input block 24 via the microphone 26. The result of recognition is also inputted to the host CPU 9. At the same time, the expected result of recognition corresponding to the inputted natural voices is inputted by using a keyboard 72 or a mouse, and the data are transferred to the host CPU 9. In the host CPU 9, learning processing similar to the automatic processing described before is performed.

The data to be inputted is displayed on the CRT 61 in the form of a composition or a word, or is pronounced from the speaker.

The procedure of learning is recorded before-hand on the CD 18 or a hard disk 16.

As for the processor for performing learning processing, the peripheral CPU 14 may be used instead of the above described host CPU 9.

Figure 4:
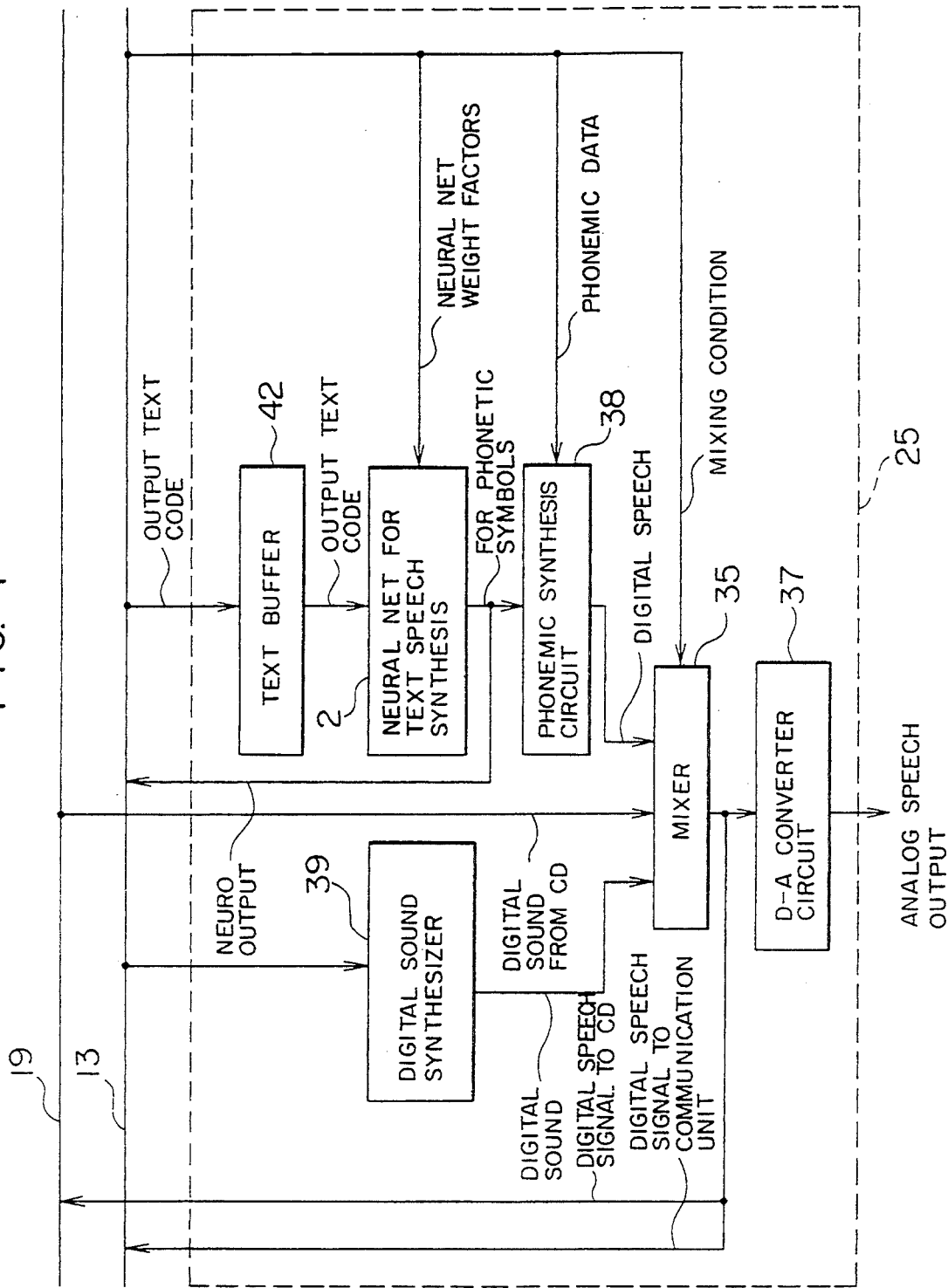
FIG. 4 is a block diagram of an embodiment of a speech output block.

FIG. 4 is a block diagram showing the speech output block 25 included in the speech interface unit 20 shown in the aforementioned FIG. 2.

As for the speech synthesis scheme using the neural net used here, the scheme described in the aforementioned literature "Use of neural net in pattern processing, signal processing and knowledge processing", Nikkei Electronics, Aug. 10, 1988.

With reference to FIG. 4, the text data code to be outputted is inputted from memory, such as the CD or the CPU, to a text buffer 42 via the CD bus 19 or the peripheral bus 13. The buffered text code is inputted to the neural net 2 for text speech synthesis, and a proper train of phonetic symbols is generated therein.

The neural net used here has a fixed structure and performs relatively low speed processing in the speech band. Among neuroprocessors disclosed in U.S. patent application Ser. No. 455,141, neuroprocessors each having a fixed data path to process a plurality of neurons or general-purpose processors including a DSP (digital signal processor) and a RISC processor can be used.

The above described train of phonetic symbols generated by the neural net 2 is converted into digital speech by a phonemic synthesis circuit 38. In addition, a digital sound reproduced from the CD 18 and a digital sound generated by a digital sound synthesizer 39 can be produced.

The above described digital signals are properly mixed by a digital mixer 35 and converted into analog signals by a D-A converter 37 to drive the speaker 27 or the like. In this case as well, weight factors of the neural net for text speech synthesis determinining the text recitation property and phonemic data of the phonemic synthesis circuit 38 determining the property of generation can be accessed via the peripheral bus 13 in the same way as the speech input block 24 described before.

The above described neural net learning also comprises automatic learning and interative manual learning.

Figure 15:
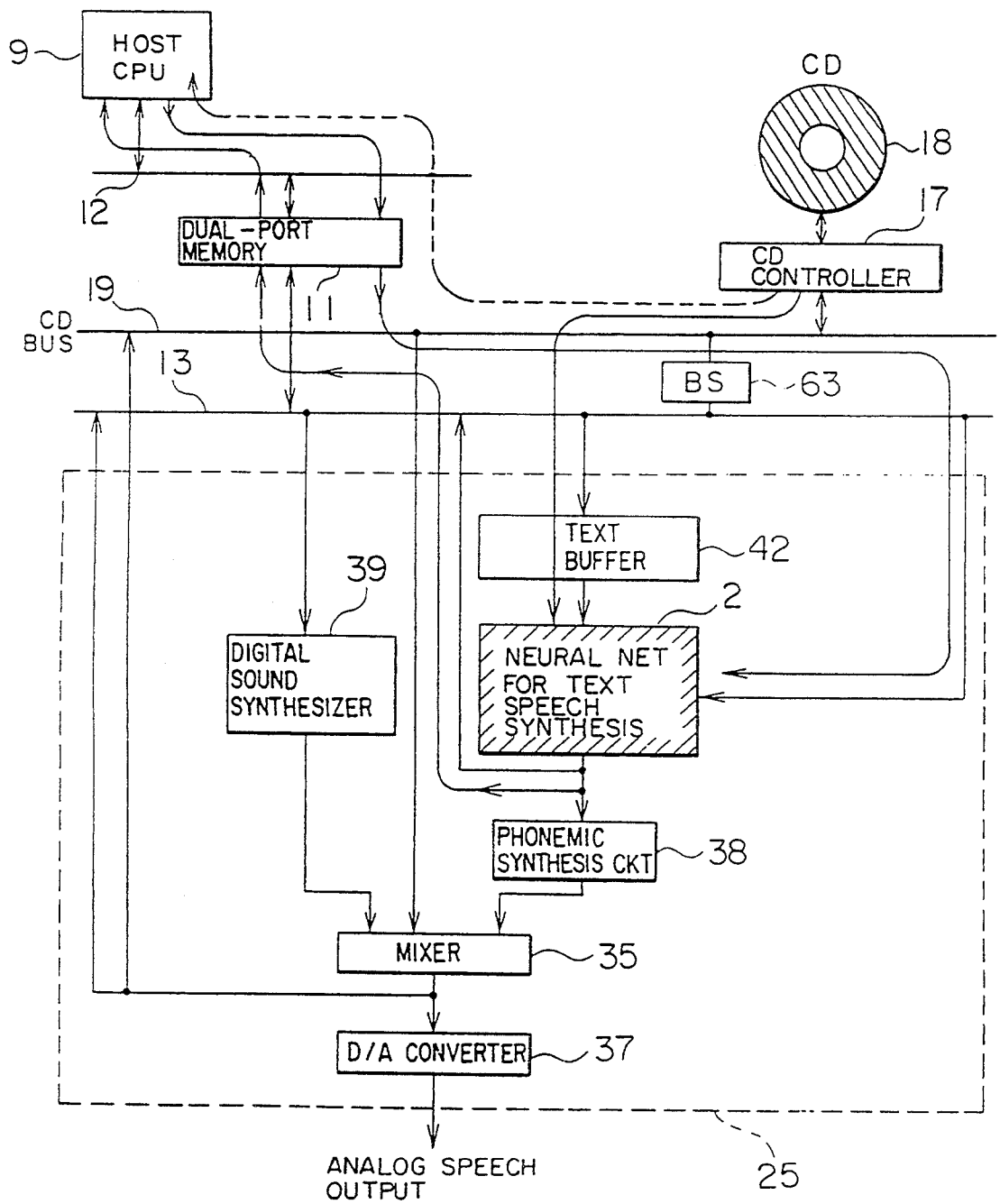
FIG. 15 is a diagram showing flow of a learning scheme of a neural net included in the speech output blocks.

Data flow in case of automatic learning will now be described by referring to FIG. 15.

For this learning, the same data as those used at the time of speech input unit learning (data shown in FIG. 14) are used. The signal inputted to the neural net 2 is a text code of a composition (such as ASCII code). Further, the expectation of the neural net output is phonemic data of the above described composition or a phonetic symbol.

The host CPU 9 adjusts weight factors of the neural net so that the error between the output of the neural net and the above described expectation may not exceed a prescribed value. Here, an algorithm such as the method of steepest descent is used.

Figure 5:
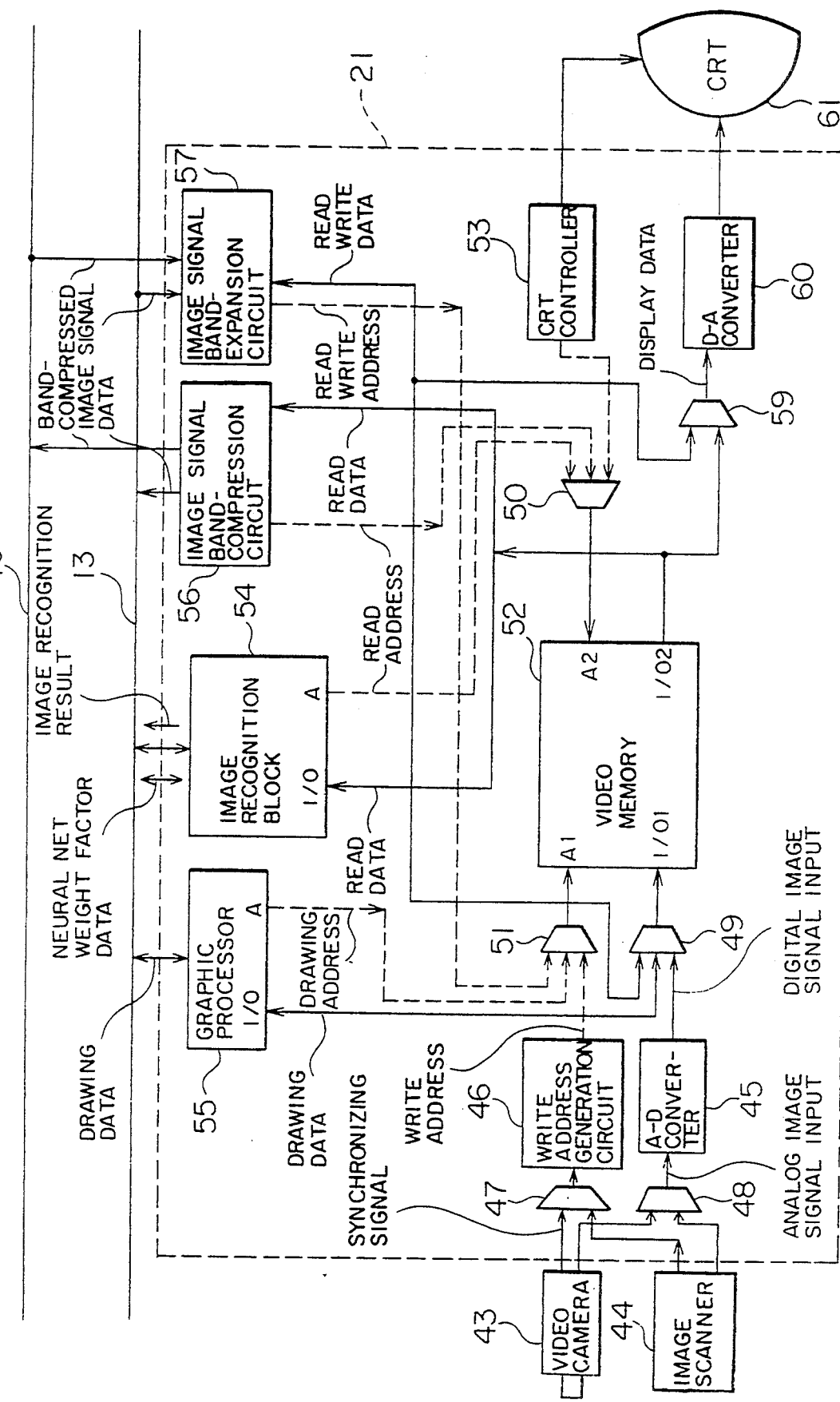
FIG. 5 is a block diagram of an embodiment of an image interface unit.

FIG. 5 is a block diagram showing the schematic structure of the image interface unit 21.

With reference to FIG. 5, the section of image recognition will first be described.

An image is taken in by a video camera 43 or an image scanner 44. Selection between them is performed by using multiplexers 47 and 48. The former multiplexer selects a synchronizing signal, whereas the latter multiplexer selects an image signal. The analog input image signal thus selected is digitized by an A-D converter 45, and then written into an input/output port I/O (input-/output) 1 of a video memory 52 via a multiplexer 49.

Further, the write address of the video memory 52 is synchronized to the synchronizing signal of the video camera 43 or the image scanner 44 is generated by a write address generation circuit 46 and is supplied to an address port A1 of the video memory 52 via a multiplexer 51.

An image recognition block 54 generates a read address and supplies it to an address port A2 of the video memory 52 via a multiplexer 50. At the same time, the image recognition block 54 reads the input image signal from a different port I/O 2 of the video memory 52. This recognition result is outputted to the peripheral bus 13. Further, neural net weight factors in the image recognition block 54 are also rewritten via the peripheral bus 13.

In addition, an image signal band-compression circuit 56 takes in the input image signal from the input/output port I/O 2 of the video memory 52 and outputs the result of its compression onto the CD bus 19 or the peripheral bus 13.

The image signal outputted to the CD bus 19 is recorded onto the CD 18, whereas the signal outputted to the peripheral bus 13 is outputted onto a communication line via the communication unit 22.

While data are being read from the video memory 52 to the image signal band-compression circuit 56, an address is supplied to the address input port A2 via the multiplexer 50.

The section of image display changes little from a conventional personal computer or work station.

First of all, general graphics are generated by a graphic processor 55. That result (drawing data) is temporarily stored into the video memory 52 via the multiplexer 49. At the same time, a drawing address is supplied to the address input port A1 via the multiplexer 51.

Drawing data is read out to an address generated by a CRT controller 53. After the drawing data is passed through a multiplexer 59 and a digital-analog (D-A) converter 60, the drawing is are displayed on a CRT 61. At this time, the CRT controller 53 supplies a read address to the address input port A2 of the video memory 52 via the multiplexer 50 and supplies a scanning signal synchronized to the read address to the CRT 61.

Display data comprise, in addition to the above described data, band-compressed image data transmitted through a communication line and band-compressed image data recorded on the CD 18. In case these are to be displayed, an image signal band-expansion circuit 57 receives band-compressed image data via the peripheral bus 13 or the CD bus 19 and performs band-expansion. The band-expanded image data are displayed on the CRT 61 via the multipelxer 59 and the D-A converter 60.

FIG. 6 is a block diagram showing the image recognition block 54 included in the image interface unit 21.

This image recognition block 54 comprises an image recognition neural net 6 and an image recognition pre-processing processor 7.

In the image recognition pre-processing processor 7, the output of the video memory 52 undergoes pre-processing such as noise reduction, color analysis and border line extraction performed by digital filters. Further, in recognizing a rotating character, continuous processing such as extraction of the center of gravity, polar coordinates conversion and Fourier transform. A general-purpose DSP for image processing and the like is used here.

With respect to the image data after pre-processing, the neural net 6 finds out the closest pattern included in the neural net, i.e., performs matching and outputs the result of its recognition to the peripheral bus 13.

Figure 9:
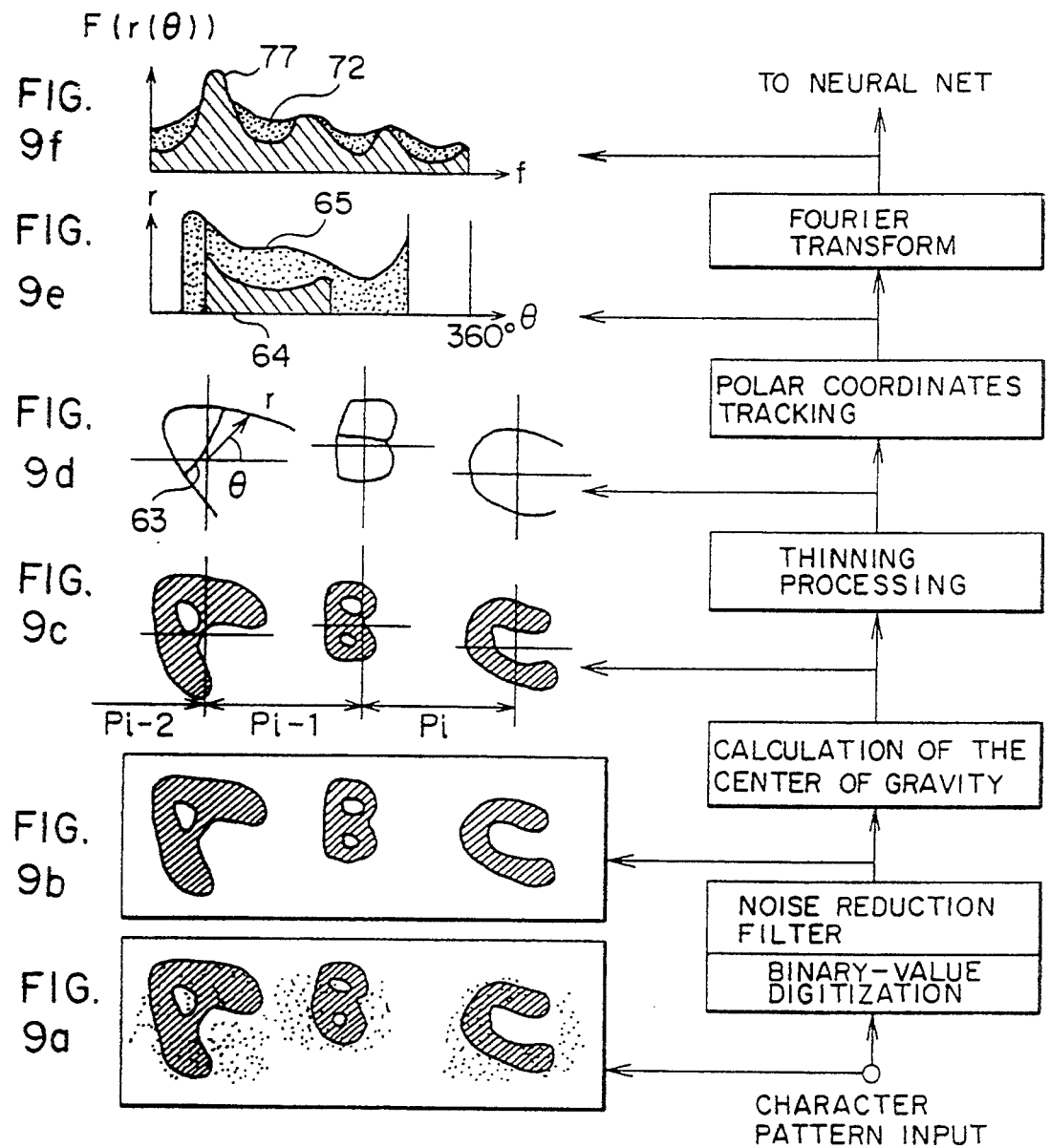
FIGS. 9($a$), 9($b$), 9($c$), 9($d$), 9($e$) and 9($f$) are diagrams showing an embodiment of hand-writing character recognition algorithm.

FIG. 9 is a diagram of one embodiment showing the contents of processing performed in cases where character recognition is performed.

The images inputted from the video camera 43 or the image scanner 44 includes noises as shown in (a) of FIG. 9 and are not uniform in slope and size. First of all, therefore, the images undergo binary-value digitization and noise reduction, resulting in images as shown in (b) of FIG. 9.

In the above described binary value digitization, the average gray level of a certain image area is calculated, and discrimination between 0 and 1 is performed on the basis of the average gray level thus calculated. In the succeeding digital noise reduction filtering, decision by majority within a certain image area is performed and the result is used as the value of the central pixel of that area.

By performing integration for each character, the center of gravity is then calculated for each character. At this time, characters are separated at the same time. This is implemented by predicting a pitch $P_i$ to the position of the center of gravity of the next character on the basis of pitches $P_{i-1}$ and $P_{i-2}$ between centers of gravity of characters obtained until then as shown in (c) of FIG. 9 or by observing variance concurrently with the center of gravity and dividing the area so that the variance may not exceed a prescribed value, for example.

Thereafter, border lines are extracted by spatial differential filtering such as Laplacian, and characters are converted in line drawing by thinning processing. This thinning process can be implemented by deriving the logical product of pixels in a spatial area comprising $3\times3$ pixels, adopting the result as the value of the center pixel of the spatial area, and repeatedly executing such processing. The above described processing is performed until the result of thinning becomes one straight line. Judgment is formed by seeing whether the image coincides with any one of candidates of line drawing conceivable in the spatial area comprising $3\times3$ pixels.

Succeedingly, the above described character line drawing is represented by polar coordinates with the center of gravity taken as the center. That is to say, the above described character line drawing is represented by using a distance r from the center of gravity and an angle $\theta$ formed with respect to the x axis.

Some characters such as characters A and B have curves forming closed areas as indicated by 63 of FIG. 9 inside those characters as well. This is also an importance feature in recognizing characters. If polar coordinates are derived in the portion of this inside border line in this case, two polar coordinates are derived with respect to one angle $\theta$ as indicated by curves 64 and 65 shown in (e) of FIG. 9. The curve 64 corresponds to the curve 63 forming the closed area shown in (d) of FIG. 9.

Thereafter, Fourier transform from the real space of angle $\theta$ to the space of the frequency f is performed. As a result, it is possible to produce character data with rotation and size difference of characters removed. The result of Fourier transform performed upon the curve 64 is represented by a curve 77, whereas the result of Fourier transform performed upon the curve 65 is represented by a curve 72.

Pre-processing for image recognition has heretofore been described.

Figure 10:
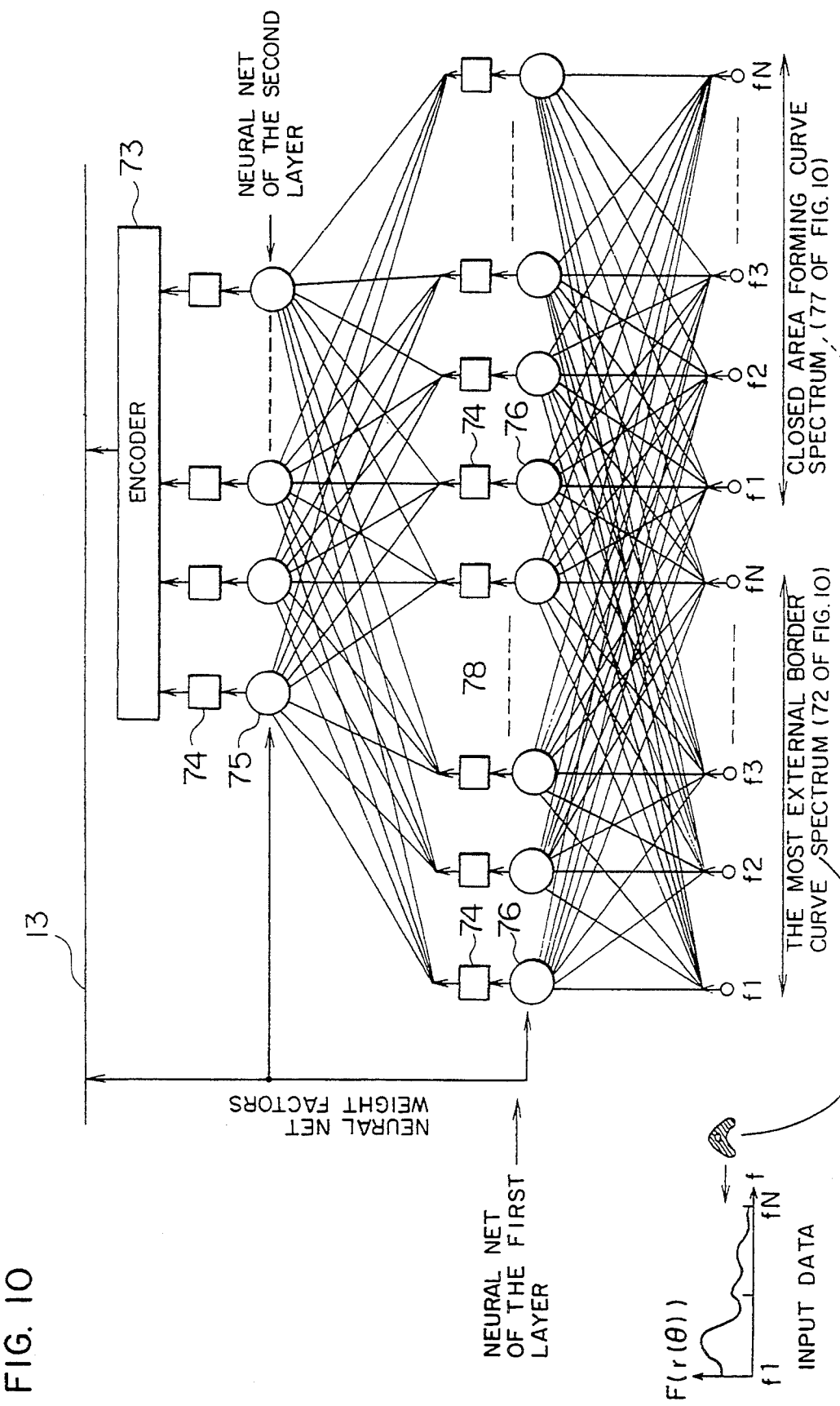
FIG. 10 is a diagram showing data flow in a neural net for image recognition.

FIG. 10 is a block diagram showing an embodiment of the neural net for performing character recognition on the basis of the above described pre-processing data.

With reference to FIG. 10, respective frequency components of the input data are supplied to corresponding input terminals such as f1, f2 and f3 and are transferred to respective neurons of a neural net of the first layer. For a character pattern having a closed area such as the above described character A, a plurality of frequency spectra are calculated. Therefore, a plurality of sets of the input terminals f1, f2, f3 - - -, are provided.

Over neurons of the first layer and the second layer, frequency patterns of respective characters are provided as weight factors $W_i$ of the neural net. Each neuron transmits the following output in accordance with a character frequency pattern supplied as weight factors and the inputted character frequency pattern.

$$\mu = f\left(\sum_{i=1}^{N} wi * fi\right) \quad (1)$$

Where fi denote values supplied to input terminals.

The above described non-linear function f(x) is implemented by a sigmoid function look-up table 74 stored in a memory. The function has a monotonically increasing function as contents as represented by the following equation.

$$f(x) = 1/[1 + \exp(-x)] \qquad (2)$$

Further, the final recognition result is outputted from the neural net of the second layer. The result of character image recognition is transferred from an encoder 73 succeeding the neural net of the second layer to the peripheral bus 13 as a character code (such as an ASCII code).

FIG. 10 shows direct implementation of the above described neural net. With reference to FIG. 10, sum of products calculation is performed in each of neuron sum of products circuits 76 and 75, and non-linear function conversion is performed in the sigmoid function look-up table 74. For neurons of each layer, there is provided means capable of reading/writing its weight factors via the peripheral bus 13.

Figure 11:
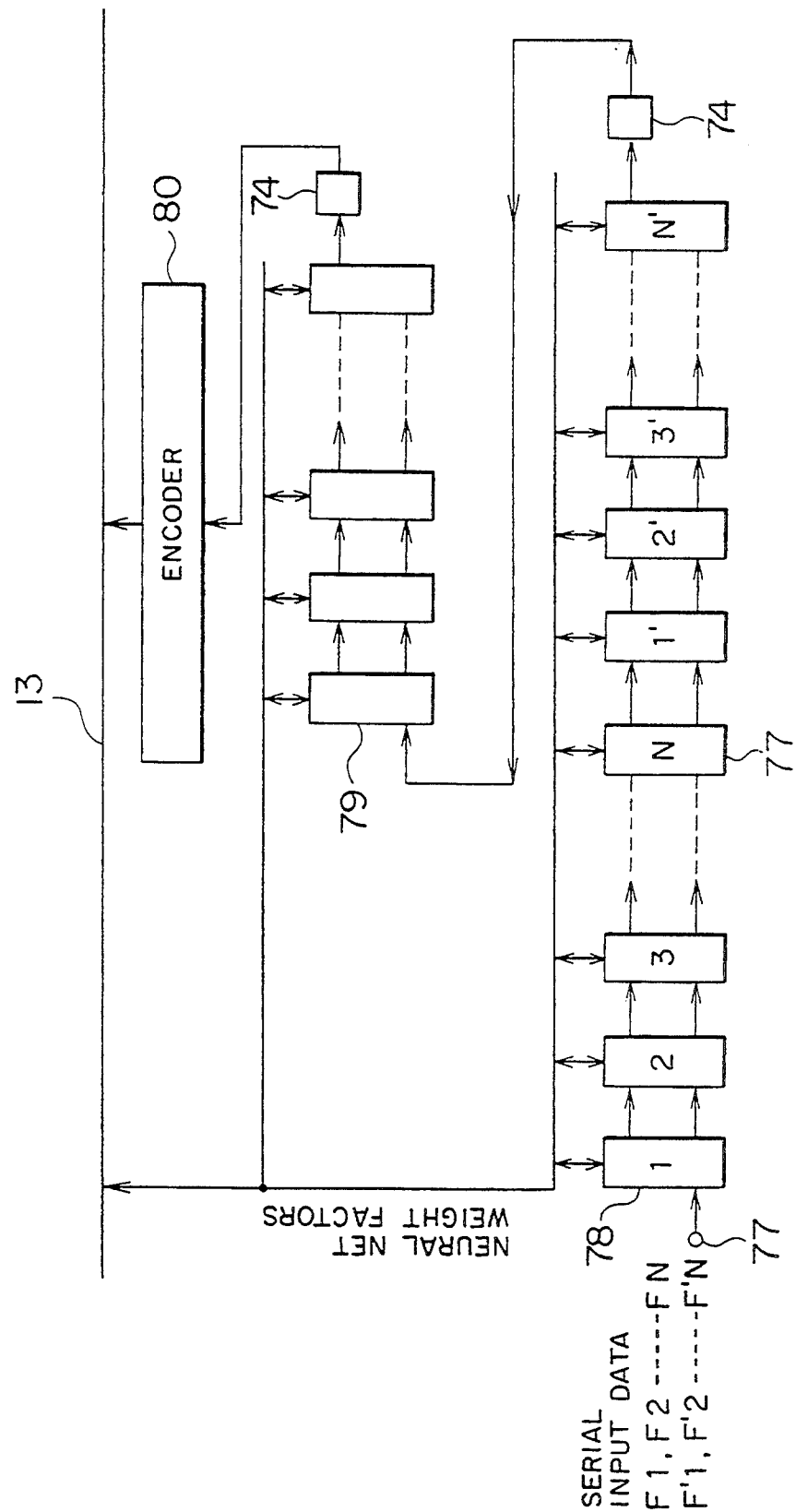
FIG. 11 is a diagram showing an embodiment of circuit configuration obtained when data flow is directly converted into a circuit.

FIG. 11 is a block diagram showing an embodiment in which the above described neural net is formed by using a high-speed signal processor for neural net as described in U.S. patent application Ser. No. 455,141.

With reference to FIG. 11, frequency component serial data F1, F2, F3 - - -, are successively inputted from an input terminal 77. Each neuron of the neural net of the first layer is implemented by using a systolic processor element. The above described serial data are successively supplied to respective elements of the first layer. Serial data are successively outputted in order of completion of sum of products calculation. Owing to such serial data, the result of sum of products of the first layer undergoes non-linear function transformation in only one sigmoid function look-up table 74. Further, the neural net of the first layer can be connected to the neural net of the second layer by using a single wire.

Further, the neural net of the second layer receives serial data from the neural net of the first layer. Its serial output data also undergoes non-linear function transformation in only one sigmoid function look-up table 74. The result is transferred to the peripheral bus 13 via an encoder 80.

Since pipeline processing is performed by taking a systolic processor element as the unit, the processing speed is as high as 1 input data/clock cycle. In case the clock cycle is 100 ns, for example, it is possible to input and process one data every 100 ns.

Figure 16:
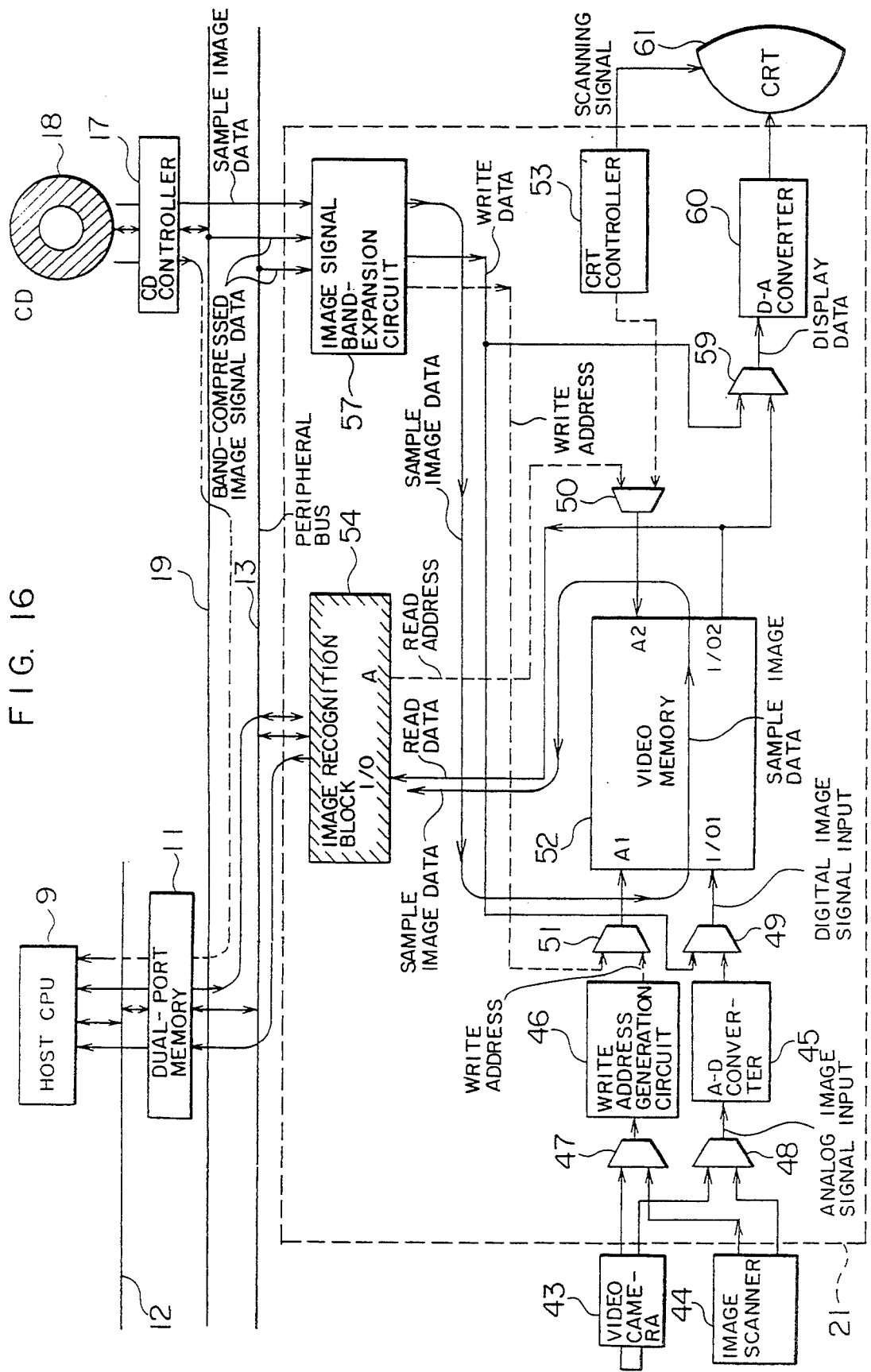
FIG. 16 is a diagram showing flow of a learning scheme of an image recognition block included in the image interface unit.

FIG. 16 is a diagram showing the processing flow of the learning method in the image interface unit 21.

In case of automatic learning, the terminal user enters a predetermined character in a predetermined form, and the character thus entered is read by an image input unit such as the image scanner 44 and recorded in a memory such as the CD 18. Since the output expectation of the neural net corresponding to the above described predetermined form and character is known beforehand, the output expectation is recorded into a memory such as the CD 18.

At the time of learning, the above described sample data stored in the CD 18 is inputted to the image recognition block 54 via the image signal band-expansion circuit 57 and the Video memory 52. At the same time, the neural net output expectation corresponding to the above described sample image data is read out from the CD 18 and transferred to the host CPU 9. The result of recognition in the image recognition block 54 is also transferred to the host CPU 9 and compared with the above described expectation. Weight factors of the neural net within the image recognition block 54 are thus updated by using an adaptation algorithm such as the method of steepest descent. This learning method is generally referred to as the back propagation method.

In case of interactive learning, hand-written characters are inputted via the image scanner 44. While those hand-written characters are being displayed on the CRT 61, characters corresponding to them are then inputted via the keyboard or the like. At this time, the result of recognition performed by using weight factors already set may be superposed. Characters to be corrected are selected by the mouse and then corrected by using the keyboard Working speed is higher in this scheme.

Figure 17:
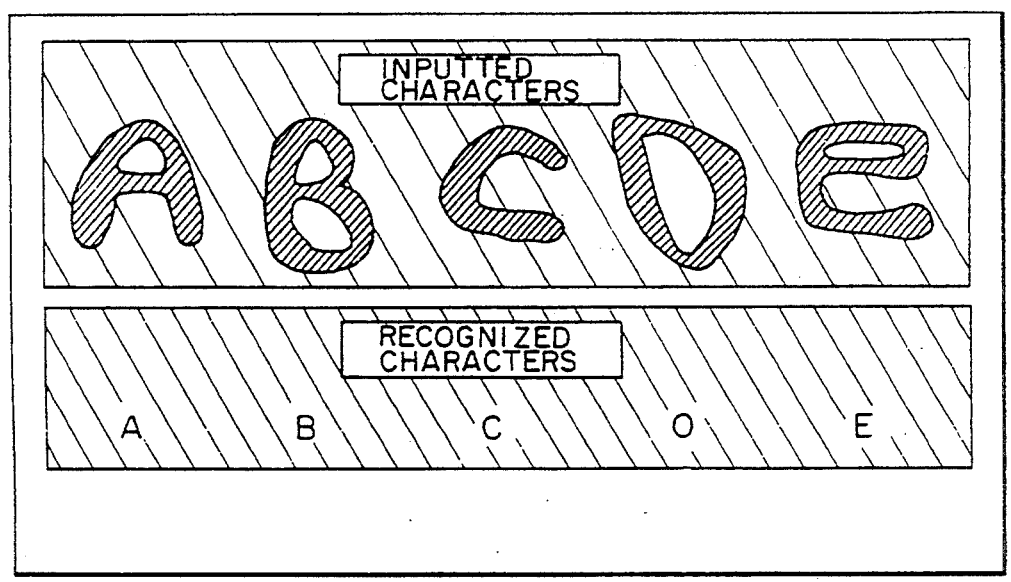
FIG. 17 is a diagram showing how to correct characters obtained as a result of image recognition.

FIG. 17 is a diagram showing an example of picture displayed on the CRT monitor in the above described initial recognition state.

As shown in FIG. 17, characters read by the image scanner 44 are displayed in the upper portion as they are. The results of recognition performed by using factors already set in the neural net are displayed in the lower portion.

In the example of FIG. 17, the terminal user inputs hand-writing characters "A B C D and E". However, the hand-writing character "D" and the character "O" can be easily mixed up. In the illustrated case, "D" is recognized incorrectly as "O" in the initial factor setting.

When the terminal user desires that its own hand-writing character will be recognized as "D", the result of recognition displayed in the lower portion is corrected to become "D" by using the mouse, keyboard or the like. The terminal performs learning by means of back propagation or the like so that such a hand-writing character may be recognized as "D". In this case, the character inputted from the keyboard becomes expectation of the output and it is transferred to the host CPU 9. The error between the expectation and the result of recognition is calculated. Thereafter, weight factors of the image recognition neural net are so corrected in accordance with an algorithm such as the method of steepest descent that the error may become small.

Instruction recognition operation will now be described.

In personal computers such as Machintosh, an instruction is inputted by using the keyboard or by selecting an icon/menu on the picture by means of a pointing device such as a mouse. In such a conventional instruction directive method, there is no vagueness in instruction (command) recognition. As a result, however, there is a possibility that response having no versality is performed. If the command input is incorrect (i.e., the instruction is an instruction which is not proper in form) in case of keyboard input, for example, rejection information is issued (i.e., an alarm speech is generally issued) to urge correct input again. Until the terminal user inputs a correct command, there is no response at all.

In a terminal of the present invention, however, flexible instruction judgment can be formed by using a neural net for instruction judgment as well. Even for incorrect command input, therefore, it is possible to confirm its contents or newly learn it to make it usable thereafter.

Instruction recognition process will now be described by referring to FIGS. 18A to 18C. Means for implementing it will be described by referring to FIG. 19 and succeeding drawing.

First of all, it is now assumed that a multi-window picture as shown in FIG. 18A is displayed on the CRT 61 of the terminal. A graph picture is displayed on the top. The case where manipulation for recording this graph onto the CD (compact disk) 18 as "graph 1" is performed in this state will now be described as an example.

The above described recording manipulation is directed by speech or the keyboard. In the following description, this distinction is not made. This is because the instruction recognition block hereafter described performs the same instruction recognition processing for both speech input and keyboard input.

First of all, the most perfect instruction is shown in FIG. 18B. It is directed at a time that "graph" which is now being displayed should be recorded into a folder named "graphs" among hierarchical folders under the name of "graph 1". Folder is a group name for putting together a lump of file groups.

It is difficult to input such a command at a breath. It is difficult in particular for speech input. In the present embodiment, therefore, interactive processing as shown in FIG. 18C allows flexible dealing.

First of all, it is now assumed that a command "save" which simply means "record" is inputted. However, it is assumed that "sabe" is inputted because of an error of spelling or unskillful English pronunciation. In a terminal of the prior art, such erroneous instruction input is rejected. In the terminal of the present embodiment, however, an instruction "save", which is the closest to the above described "sabe" among registered instructions, is reminded of (selected) by using the neural net. A question "Do you want to save?" is put to the user to obtain confirmation.

Figure 19:
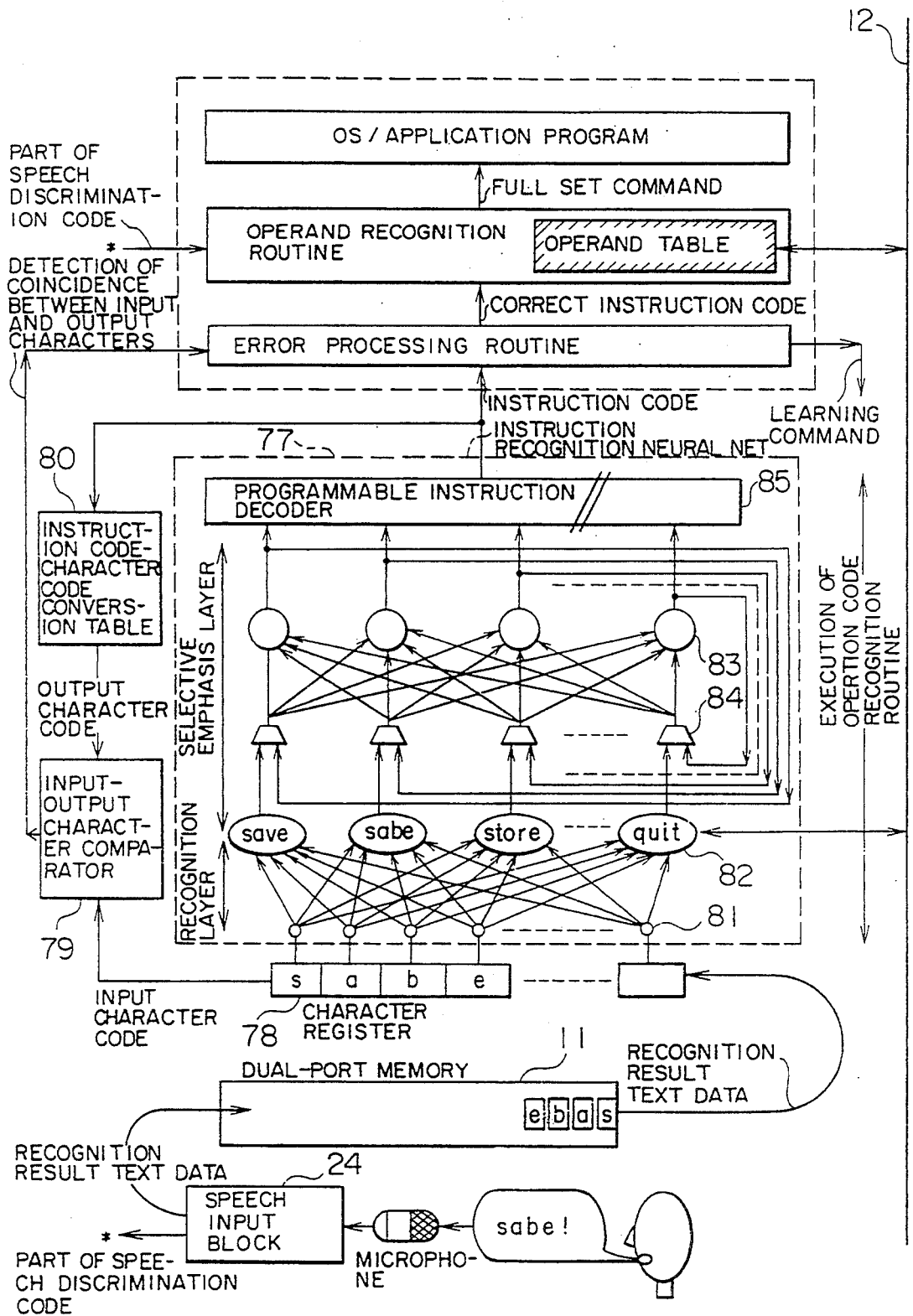
FIG. 19 is a diagram showing the operation of an instruction recognition neural net in case of speech instruction input.
Figure 20:
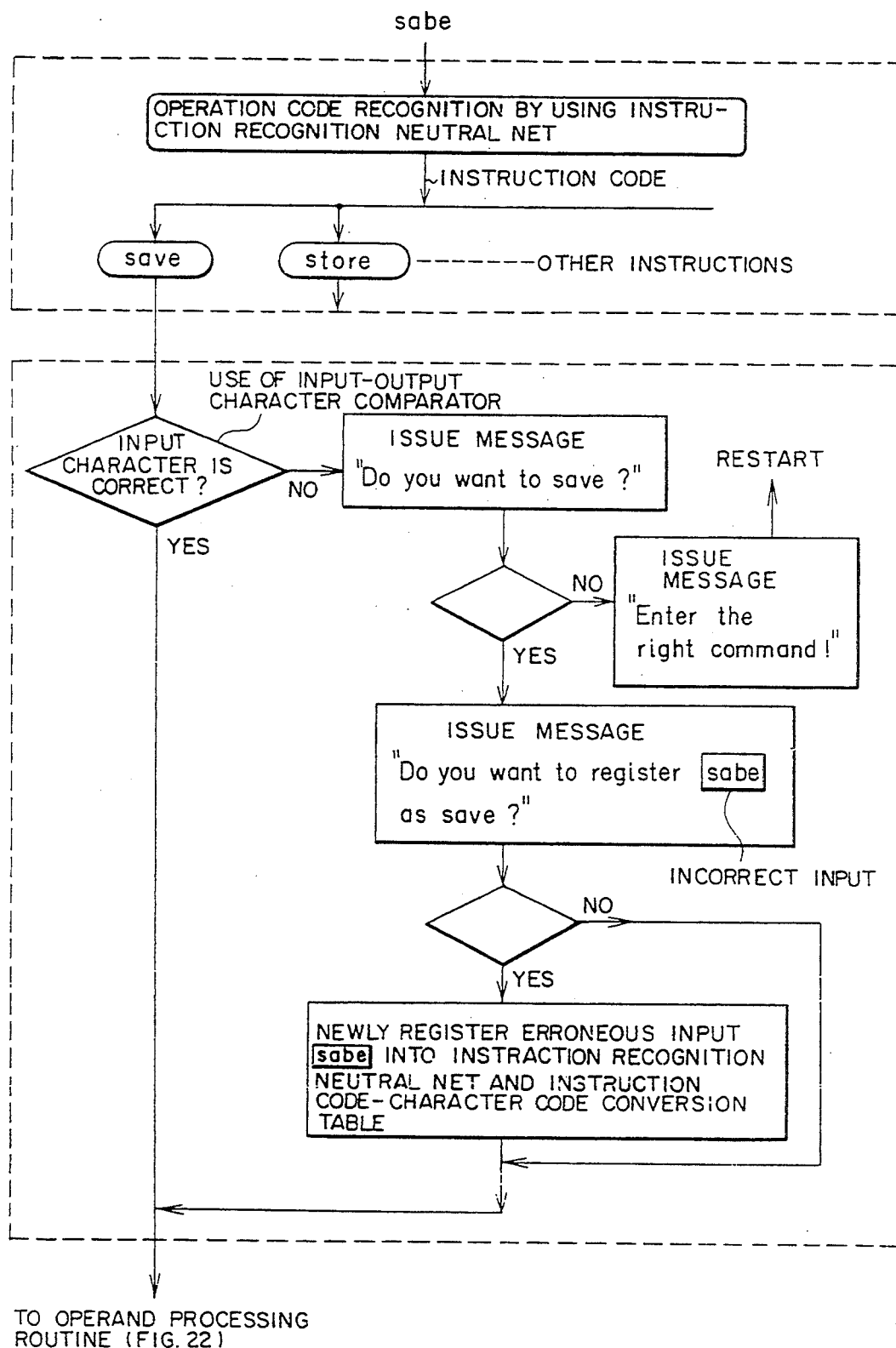
FIG. 20 is a diagram showing an embodiment of operation of an error processing routine.

Details of the above described instruction recognition processing will hereafter be described by referring to FIGS. 19 and 20.

FIG. 19 is a diagram showing the operation of an instruction recognition neural net in case of speech instruction input.

With reference to FIG. 19, a speech input instruction recognized by the speech input block 24 is inputted to a character register 78 via the dual-port memory 11 by taking a word as the unit. When the word "sabe" is obtained, character codes of that text data are inputted to the instruction recognition neural net 77 of FIG. 19.

In case the false word "sabe" is not registered in the speech input block, it is not recognized as a word and it is transferred to the character register 78 as serial data comprising characters "s", "a", "b" and "e". In this case as well, the above described four characters are handled as one word and inputted to the instruction recognition neural net 77, if the succeeding word is clear and accurate or if further data are not inputted. As a result, such an erroneous instruction input which is not found in the dictionary can also be dealt with.

The instruction recognition neural net 77 comprises a neural net of the first layer for storing an instruction character code in the coefficient form and a neural net of the second layer for receiving the output of the neural net of the first layer and emphasizing the result of judgment.

The neural net of the first layer comprises a plurality of neurons 82 of the first layer to see matching between input character codes and stored character codes. A neuron having closer patterns yields a higher output.

The neural net of the second layer comprises a plurality of neurons 83 of the second layer and receives the result of judgment formed in the above described neurons 82 of the first layer. The results of processing upon its inputs are inputted to the neurons 83 of the second layer again via multiplexers 84.

Weight factors of the neural net of the second layer are so set that the output value of a neuron may be increased by an input from its own neuron and the output value may be decreased by inputs from other neurons. As a result, an output which is higher in value even slightly than other outputs is emphasized increasingly, whereas an output which is lower in value than other outputs becomes still less. As a result, the result of judgment in the neural net of the first layer is emphasized, and only one instruction candidate which is regarded as the most probable is selected. The result is converted into an instruction code by a programmable instruction decoder 85.

The instruction code is converted into an output character code by an instruction code-character code conversion table 80 and then compared with the input character code by an input-output character comparator 79. If the inputted character is already registered in the instruction recognition neural net 77, the input character code coincides with the output character code. In case an erroneous input "sabe" as in the previous example is not registered in the instruction recognition neural net 77, however, an instruction code which has the strongest resemblance to the character code "sabe" and which corresponds to "save" is outputted. This output is converted into an output character code by the conversion table 80.

In the above described case, the input character code does not coincide with the output character code. Therefore, the comparator 79 detects this and activates an error processing routine of the host CPU 9.

FIG. 20 is a diagram showing the above described error processing routine.

With reference to FIG. 20, the instruction code "save" is first conveyed to the error processing routine by an operation code recognition routine executed by the instruction recognition neutral net 77.

In the error processing routine, it is first checked whether the inputted character is right or not, i.e., whether the inputted character is already registered in the instruction recognition neural net 77 or not. This is implemented by using the output of the comparator 79 described before.

If the inputted instruction is correct, the input and output character codes coincide. If the inputted instruction is incorrect right, the input character code does not coincide with the output character code.

In case the inputted character is correct, processing proceeds to the next operand processing routine. If the inputted character is not correct, the following message is represented as speech or a message on the CRT to confirm the real intention of the instruction.

"Do you want to save?"

If the terminal user inputs "yes" at this time, the following message is issued to ask whether the incorrect input should be newly registered or not. "Do you want to register sabe as save?"

The above described processing is performed to cope with the case where incorrect input "sabe" is often performed thereafter because of the user's habit.

If the terminal user answers "yes", the host CPU newly registeres "sabe" into the instruction recognition neural net 77 and the instruction code-character code conversion table 80. Even if "sabe" is inputted thereafter, therefore, it is recognized as the save command and the save command is executed by the host CPU.

If "no" is inputted, the following message is issued to request a correct command. "Enter the right command!"

In addition to registering similar commands such as the above described "save" and "sabe", it is also possible to register completely different commands. In case it is desirable to register "record" as the "save" command, for example, new registration of "record" into the instruction recognition neural net 77 and the instruction code-character code conversion table 80 is performed separately and forcibly. In this case, the following interactive setting method is used.

User: "Register record as save!"

Terminal answer: "Do you want to register record as the command save?"

User: "yes"

Even if an instruction code which is different from an original instruction character code is inputted, it is thus possible to deal with it flexibly by top-down learning (i.e., learning under the administration of the user). Such learning is effective in case where it can be definitely judged whether the instruction code is correct or not as in instruction recognition, as compared with the back propagation method whereby learning is performed purely by signal processing.

Unlike the case where an instruction is inputted by speech, neuro weight factors are so set in case of keyboard input that the "save" instruction may be issued even for inputs such as "sabe" or "seibu" with due regard to an error of spelling.

Figure 21:
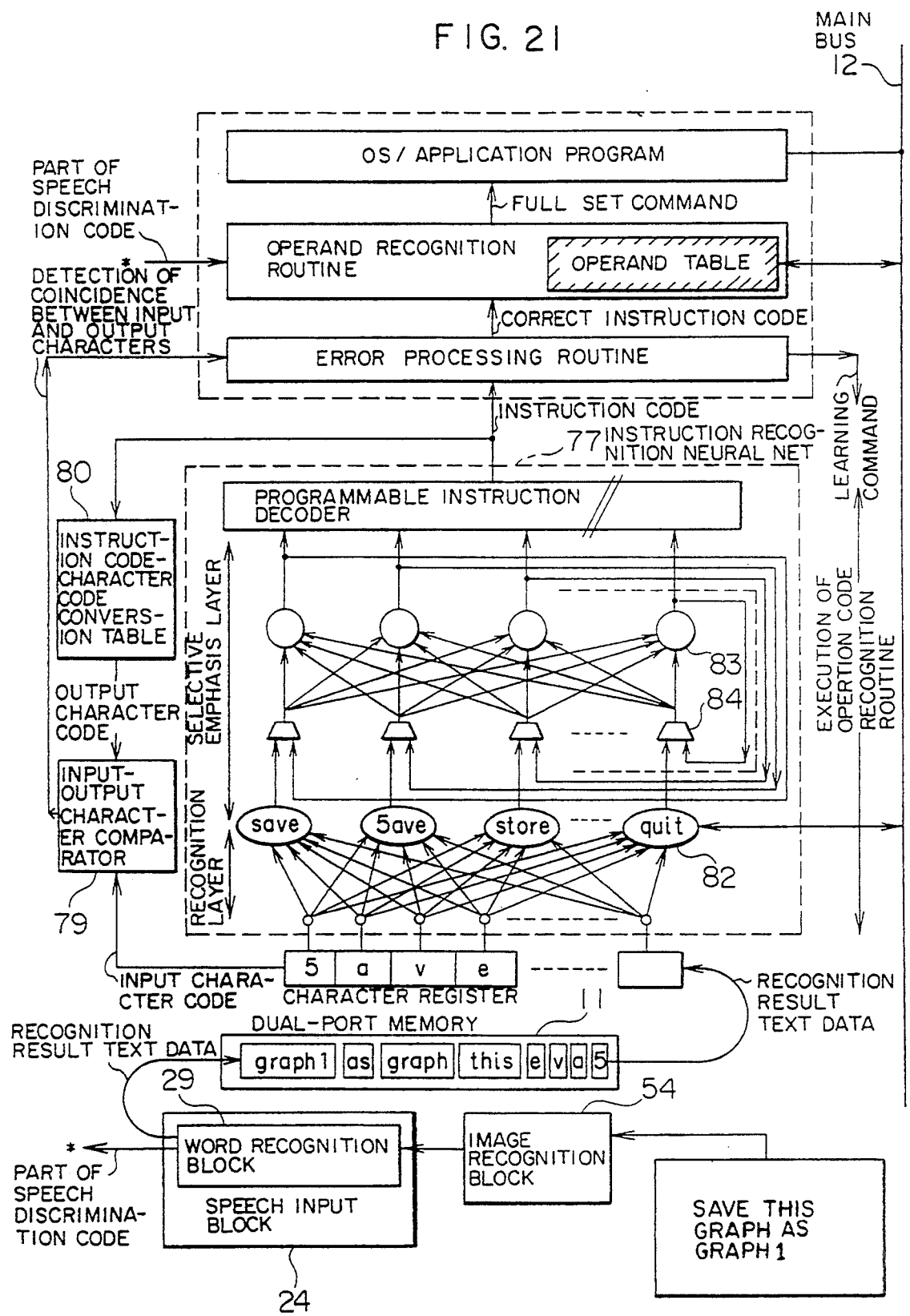
FIG. 21 is a diagram showing an example of operation of the instruction recognition neural net in case of hand-writing instruction.

Further, in case an instruction is inputted by using image recognition as represented by hand-writing instruction input of FIG. 21, neuro weight factors are so set that not only the above described erroneous spelling but also "5ave" resulting from mistaking "5"for "s" may be recognized as "save". This setting can be implemented by so registering that cases having possibilities of error occurrence such as "sabe" and "5ave" may be recognized as "save".

Further, the speech, hand-writing character image, or keyboard input is detected, and neuro weight factors which are optimum with respect thereto are set. These coefficients are set into a local memory of a neuroprocessor beforehand and selection out of them is performed by instruction input means.

If the instruction is then interpreted correctly, the instruction code enters an instruction operand processing routine.

Figure 22:
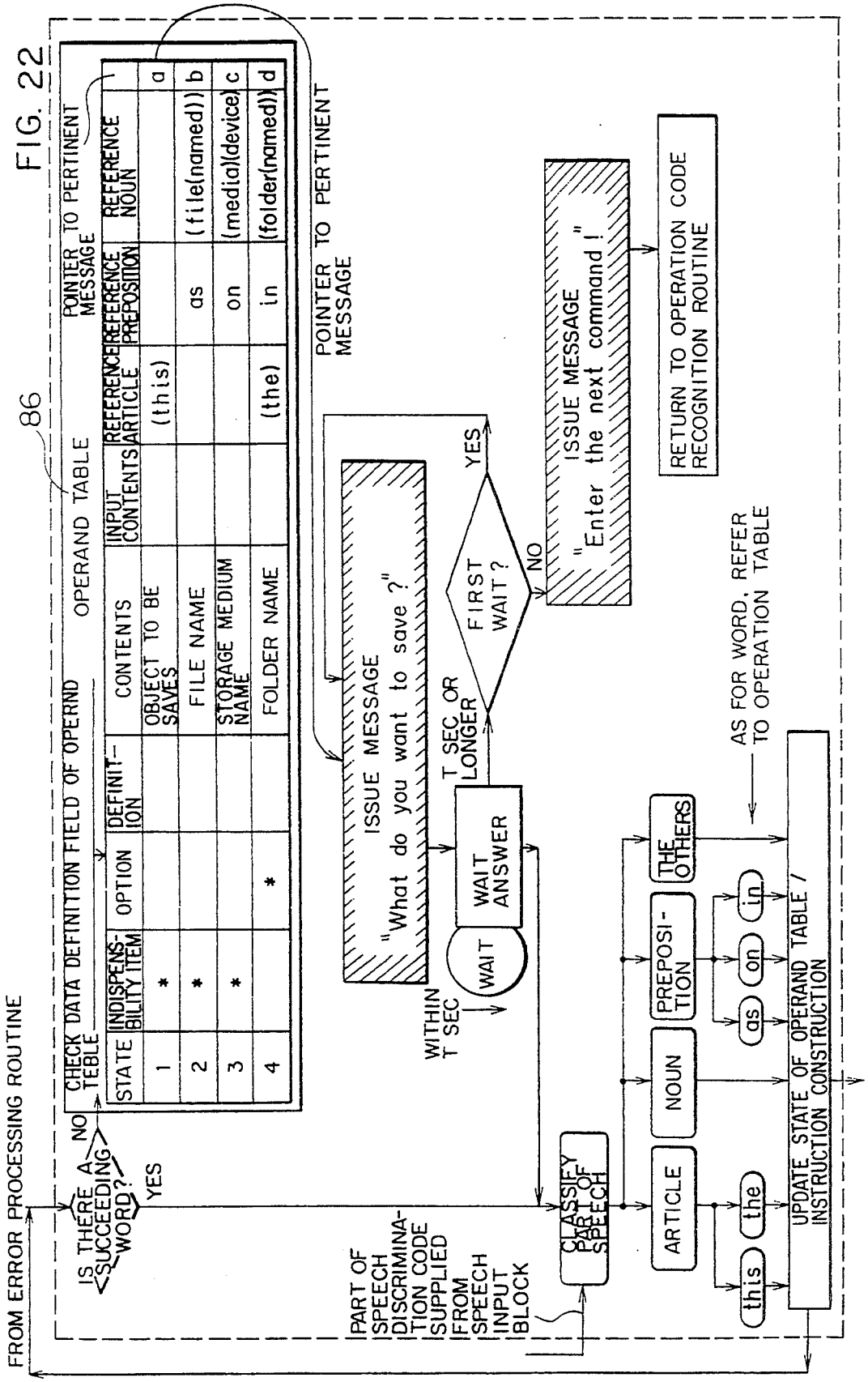
FIG. 22 is a diagram showing an embodiment of an instruction operand processing routine.

FIG. 22 is a diagram showing the above described processing.

In this flow, operands (such as variables and parameters) required for the instruction execution are recognized. If necessary, the user is urged to input them. In this case, it is first checked whether there is a word succeeding the inputted instruction code or not. In case there is no word succeeding the inputted instruction code, defined data field of an operand table 86 is checked.

This operand table 86 is registered for each instruction and contains operand information required for executing that instruction. With respect to the "save" instruction, for example, the operand table specifies four operands, i.e., an object to be saved, a file name in saving, a storage medium, and a folder name of storage destiantion. However, indispensable operands among them are the former three ones as specified in an indispensability term field. Definition field is a field for indicating whether these operands are already inputted and defined or not. In the state illustrated in FIG. 22, any operand is not defined yet.

In order to refer to each operand in natural language, an article, a preposition, a noun or the like accompanying that operand can be used. The operand table stores this information as well.

In case the object to be saved is specified, it is natural to use article "this" as in "save this graph".

Further, the parameter succeeding the preparation "as" is the file name. The parameter succeeding the preposition "on" is the recording medium of storage destination (such as CD). The parameter succeeding the preposition "in" is the folder name. This operand table is also programmable by the user.

The processing changes depending upon the state of the operand table.

Figure 23:
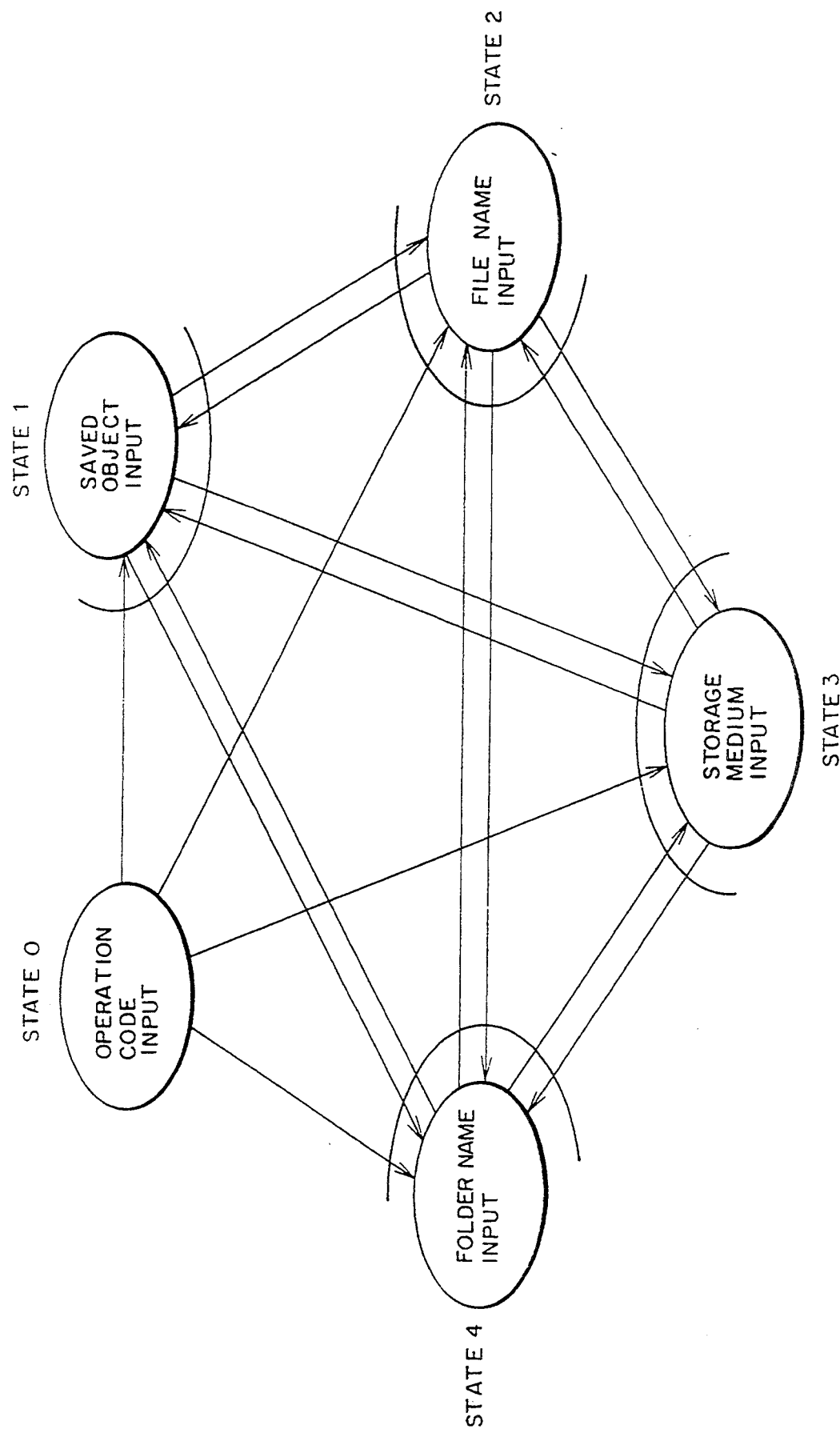
FIG. 23 is a state transition diagram of the instruction operand processing routine.

FIG. 23 is a diagram showing the above described state transistion.

With reference to FIG. 23, the operand table is in operation code input wait state (state 0) when an instruction is not inputted yet. In this state, an instruction is inputted. In case there is no succeeding word as in the previous example, the operand table moves to the next state (state 1).

In the state 1, the memory (main memory 10 of FIG. 1) is accessed in accordance with pointer "a" to the pertinent message indicated at the rightmost end of the operand table 86 shown in FIG. 22. In order to urge the user to input the object to be save, the following message as shown in FIG. 22 is issued.

"What do you want to save?"

After the above described message has been issued, input from the user is waited for T seconds. If T seconds or more has elapsed in the first wait, the above described message is issued to the user again. If T seconds or more has elapsed in wait other than first wait, this instruction is considered to be canceled and the following message is issued. "Enter the next command!" Thereafter, the operand table returns to the operation code recognition routine.

In case there is operand input, the part of speech is recognized in accordance with the part of speech discrimination code issued by the speech input block concurrently with the result of recognition. Instruction construction (i.e., collection of parameters required for the instruction) is performed by referring to the operand table. At the same time, the state is updated in accordance with FIG. 23.

Until the construction is complete, the operand table returns again to the top processing step shown in FIG. 22, i.e., the step of judging whether there is a succeeding word or not.

When the construction of the instruction has been completed, i.e., when all of indispensable operands for the instruction have been defined, full set command is tranferred to the OS (operating system) and the application program.

Operation of the state transition shown in FIG. 23 will now be described in more detail.

If there is no succeeding word in the instruction input waiting state (i.e., state 0), the operand table proceeds to the next state 1 and the message for urging the user to input the object to be saved is issued as described before. If the next word is inputted at this time,.the state transits in accordance with the contents of that next word. If article "this" is inputted, for example, the operand table remains in the state 1 and the noun succeeding "this" is regarded as the object to be saved.

If the article "in" is inputted although the user is urged to input the object to be saved, the operand table proceeds to state 4 for inputting the folder name and the noun succeeding "in" is registered as the folder name. In some cases, however, something different from that requested by the issued message comes and the following caution message is issued.

"Not the object to be saved, but the name of the folder is acquired."

While thus checking the contents of input of each stage, the instruction is constructed.

The state transition heretofore described is constructed in accordance with the operand table. The operand table is peculiar to each instruction and can be programmed by the user.

Carriage and implantation of data will now be described.

As shown in FIG. 1, it is possible to exchange data between the neural net 77 for instruction recognition and the memory card 23 via the main bus 12 and the peripheral bus 13. As a result, it is possible to carry use method (i.e., instruction recognition method) peculiar to the user, and hence it is possible to implant the use method to other terminals.

Figure 7:
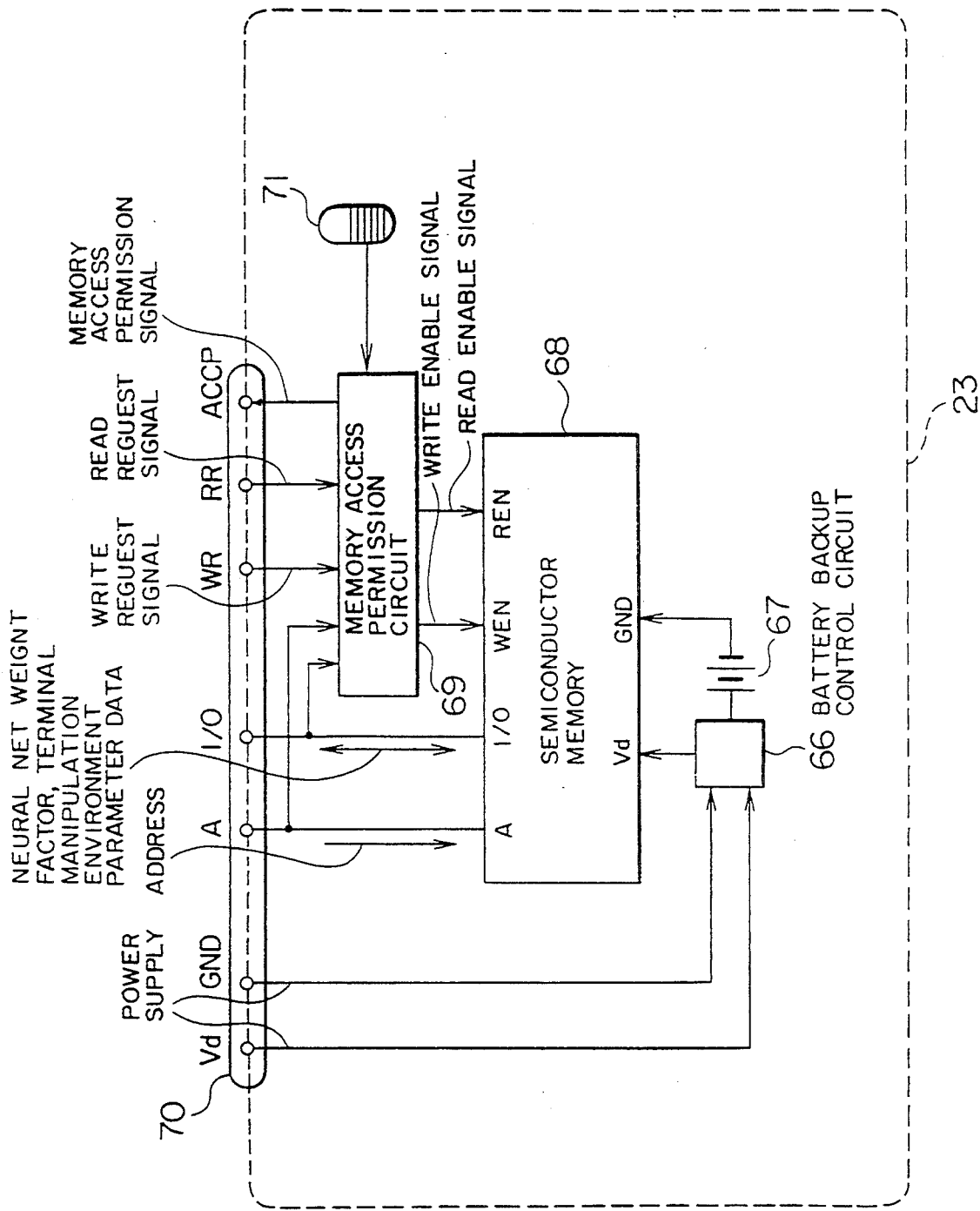
FIG. 7 is a block diagram of an embodiment of a memory card.

FIG. 7 is a block diagram showing an embodiment of the memory card 23.

In the example shown in FIG. 7, a volatile semiconductor memory 68 is used as the memory. As a matter of course, however, a battery backup control circuit 66 and a battery 67 may be omitted by using a non-volatile memory.

The memory card 23 shown in FIG. 7 is connected to the terminal main body via a connection connector. This may be direct electrical connection or may be indirect coupling such as electromagntic coupling or optical coupling.

Operation will now be described. An address is inputted from a terminal A, and data are exchanged via a terminal I/O. When data is to be written, a write request signal WR is inputted from the terminal. This signal enters a memory access permission circuit 69, which issues a write enable signal WEN. When data is actually written into the memory, the write enable signal WEN is used. For doing this, however, the terminal must write a predetermined password into a specific address of the memory access permission circuit 69 via the I/O terminal.

In writing operation, it is necessary that a write inhibit switch is not set at the inhibit side. Owing to this write inhibit switch, only permitted person can write data into the memory card 23. Further, the write inhibit switch 71 may be set at the inhibit side so that the permitted person may not erase data carelessly.

If memory access is permitted, a memory access permission signal ACCP is issued. Thereby, the user or terminal can detect that writing is permitted and can start writing.

When contents of the memory card 23 are called as well, a read request signal RR is inputted in the same way as the foregoing description. This signal enters the memory access permission circuit 69, which issues a read enable signal REN. When contents of the memory are actually read out, the read enable signal REN is issued. For doing this, however, the terminal must write a predetermined password into a specific address of the memory access permission circuit 69 via the I/O terminal.

As a result of control exercised by the battery backup control circuit 66, power is fed from the battery 67 to the memory 68 when the memory card 23 is disconnected from the terminal main body. When the memory card 23 is connected to the terminal main body, power is fed from the power supply of the terminal main body and concurrently therewith the battery 67 is charged.

Such read/write inhibit function can be applied to other memories as well. Further, data readout may be inhibited. For example, even if the CPU issues a read command, transfer of the read command to the neural network may be inhibited.

Figure 12:
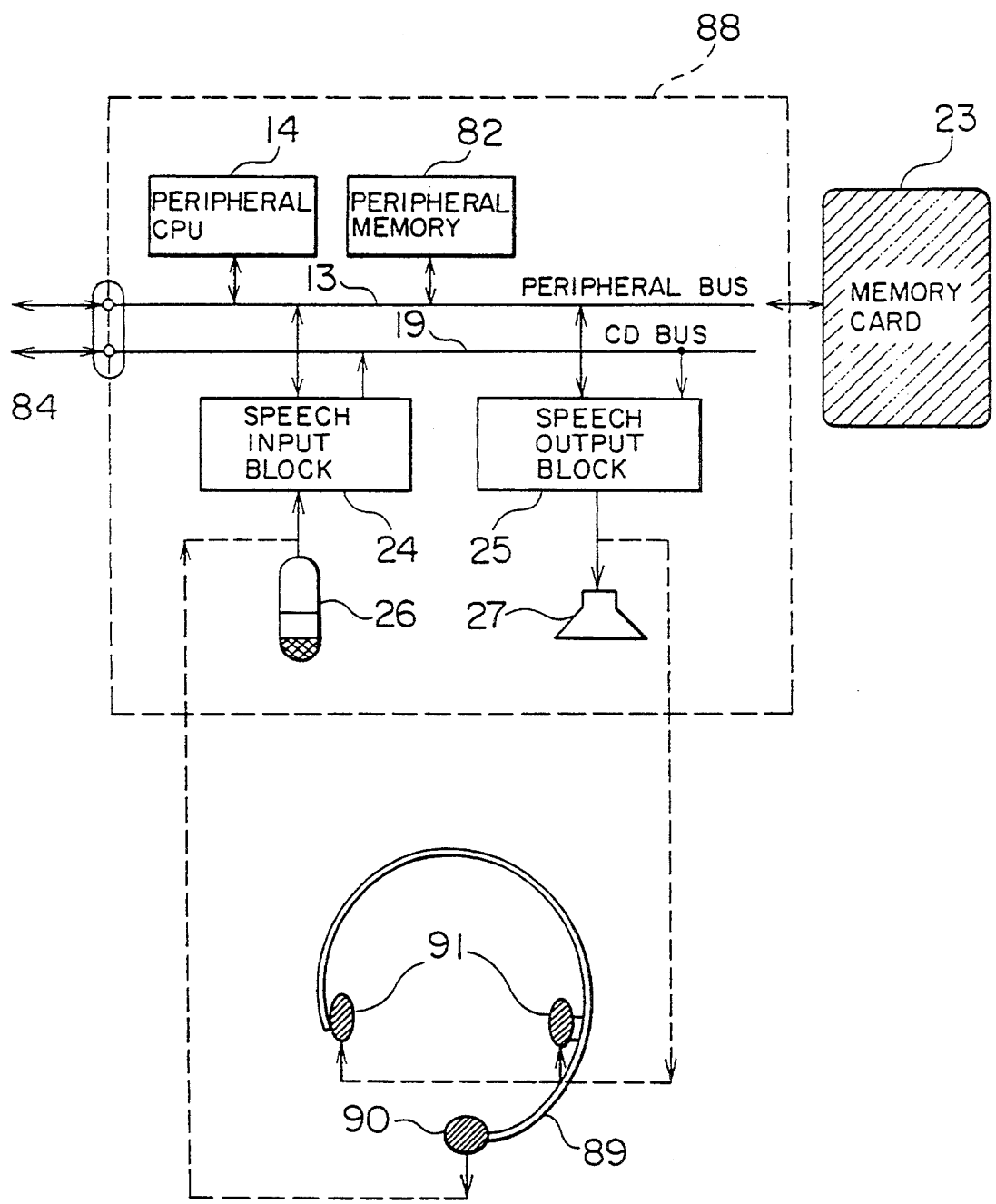
FIG. 12 is a block diagram of an embodiment of a portable speech interface unit.

FIG. 12 is a block diagram showing an example of application of the present invention and exemplifies the case where only the speech interface unit is so disconnected from the terminal main body as to be portable.

This portable speech interface unit 88 comprises the speech input block 24, the speech output block 25, and the peripheral CPU and the peripheral memory 82 for controlling the blocks 24 and 25. That is to say, the portable speech interface unit comprises minimum components required for speech recognition and synthesis.

In this case, only the basic portion of the instruction recognition described before is processed by the peripheral CPU 14. Further, the neural net processing can also be executed by using the sum of products processing program of the host CPU 9 though it is slow.

A principal object of this portable speech interface unit 88 is to allow taking notes of dictation of the user in an arbitrary place at an arbitrary time.

The data of the dictation note are temporarily inputted to the peripheral memory 82 or the memory card 23. By connecting the peripheral memory 82 or the memory card 23 to the terminal main body, it is possible to make a fair copy of data of the dictation note by means of a word processor application program or transfer the data of the dictation note to another computer or terminal through a communication line.

Figure 13:
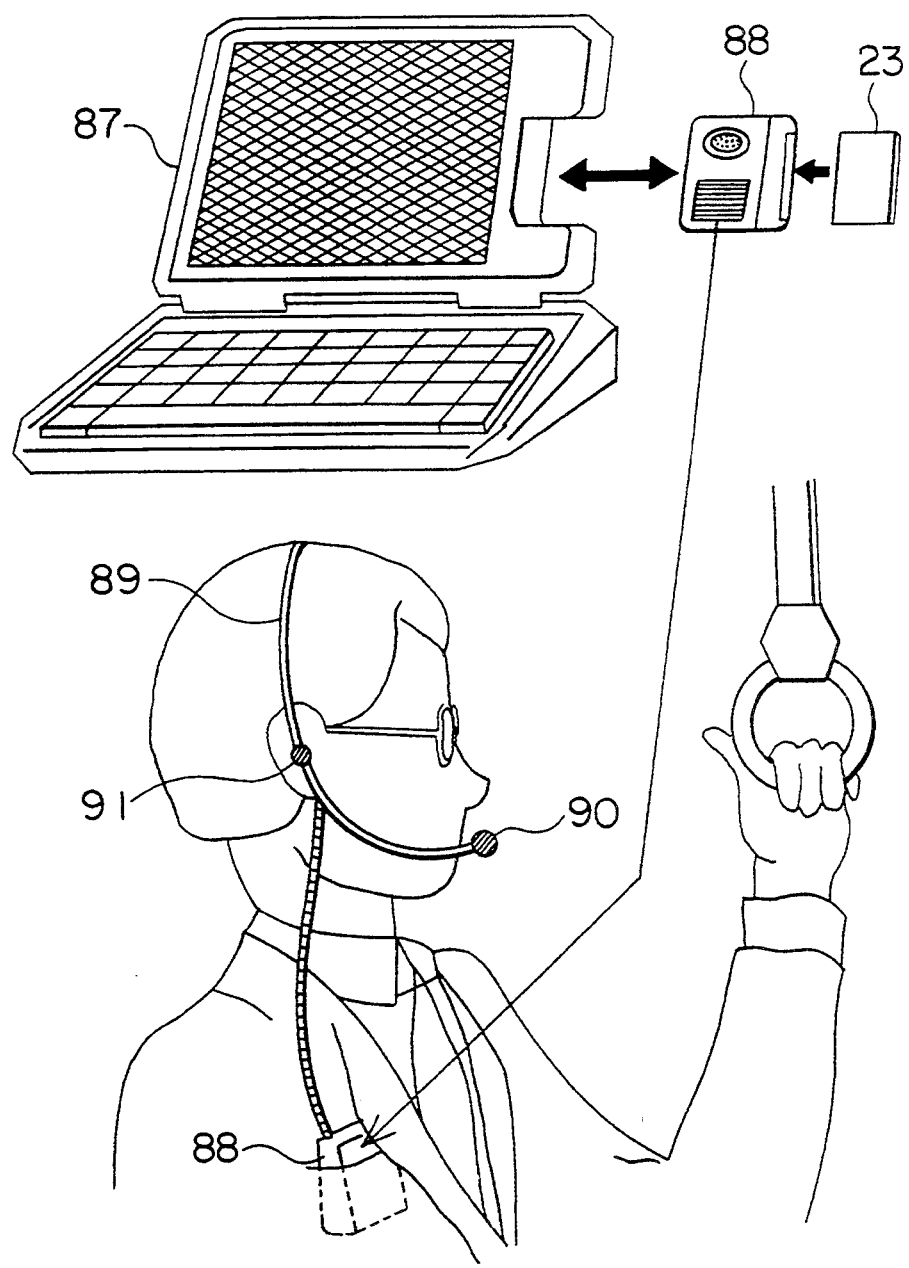
FIG. 13 is a diagram Showing an example of use of the portable speech interface unit.

FIG. 13 shows a concrete example of the above described use.

In this example, the portable speech interface unit 88 and the memory card 23 forming a part of lap-top terminal main body 87 can be so detached from the terminal main body 87 as to be portable.

As illustrated, this unit can be detached from the terminal main body and brought into a commuter train in order to take notes of dictation by using a microphone 90 attached to the head set 89. As a matter of course, inputting is possible during walk or during movement using an automobile or an airplane. Numeral 91 denotes an earphone for monitor.

Owing to the above described configuration, composition input time can be largely saved.

Owing to the present invention, it becomes possible to realize a computer terminal capable of flexibly dealing with speech input and hand-writing character input by using the neural net. Further, by combining flexible processing of the neural net and accurate processing using knowledge data base (such as operand table), instruction recognition at higher level can be flexibly dealt with. Their flexibility is realized by learning manipulation likings, pronunciation and writing parameters peculiar to the user. Further, owing to the configuration of the present invention, it becomes possible to store and carry the above described data peculiar to the user in a memory card in the form of neural net weight factors and manipulation environment parameters. As a result, it becomes possible to preserve manipulation environment peculiar to the user and down-load it to another terminal for customisation with respect to the user, resulting in many effects.

In the present invention, the neural network may be provided in only either of the speech interface unit and the image interface unit. Further, it is possible that both the speech and image interfaces comprise neural networks and an instruction recognizing neural net is not provided.

In the present invention, synthetic recognition using a combination of inputted image and speech may be performed in the image or speech interface unit. Or synthetic recognition may be performed in the host CPU or peripheral CPU on the basis of the result of recognition performed in both image and speech interface units.

Further, it is also possible to make the image interface unit mountable to/detachable from the terminal device so as to carry the image interface unit. For example, the result of recognition of lip movement may be thus made portable.

Further, in each interface unit for recognition, the neural network, fuzzy control and knowledge base may be arbitrarily combined to perform recognition.

We claim:

1. An information processing apparatus, comprising:
   an interface unit for inputting a plurality of commands into the information processing apparatus, the interface unit including a first neural network for converting each of said plurality of commands in a corresponding plurality of digital data;
   an instruction recognition an error correction unit including a second neural network connected to said first neural network for recognizing instructions among said plurality of digital data converted by said first neural network and in an event of an error, providing a best guess substitutional instruction executable by the information processing apparatus; and,
   processing means for performing a desired processing to execute said recognized or said substitutional instructions.

2. The information processing apparatus according to claim 1 wherein each of the first neural network and the second neural network are adapted to perform disparate functions.

3. The information processing apparatus according to claim 2 wherein said first neural network is adapted to:
   i) recognize a plurality of instruction segments in said plurality of commands and ii) convert said plurality of recognized instruction segments into said plurality of digital data.

4. The information processing apparatus according to claim 2 wherein said second neural network is adapted to recognize said substitutional instruction based on said plurality of instruction segments from the plurality of digital data of the first neural network.

5. The information processing apparatus according to claim 1, wherein said plurality of commands comprise analog data, and wherein said interface unit includes means for converting said analog data to said plurality of digital data.

6. The information processing apparatus according to claim 5, wherein:
   said interface unit includes speech input means for inputting a spoken command; and,
   said first neural network includes means for converting said spoken command to said plurality of digital data.

7. The information processing apparatus according to claim 5, wherein:
   said interface unit includes handwritten command input means for inputting a handwritten command; and,
   said first neural network includes means for converting said handwritten command to said plurality of digital data.

8. An information processing apparatus, comprising:
   an interface unit for inputting a first plurality of commands and for converting said first plurality of commands into a corresponding plurality of digital data, said converting being performed by a first neural network in said interface unit;
   a keyboard for inputting a second plurality of commands;
   an instruction recognition and error correction unit for recognizing, as recognized instructions, i) said plurality of digital data converted by said interface unit and ii) said second plurality of commands inputted by said keyboard, and in an event of an error, providing a best guess substitutional instruction executable by the information processing apparatus, said recognizing and providing being performed by a second neural network in the instruction recognition unit and connected to the first neural network;
   processing means for executing a desired processing to perform said recognized or said substitutional instructions.

9. The information processing apparatus according to claim 8 wherein each of the first neural network and the second neural network are adapted to perform disparate functions.

10. The information processing apparatus according to claim 9 wherein said first neural network is adapted to:
    i) recognize a plurality of instruction segments in said plurality of commands and ii) convert said plurality of recognized instruction segments into said plurality of digital data.

11. The information processing apparatus according to claim 10 wherein said second neural network is adapted to recognize said substitutional instruction based on said plurality of instruction segments from the plurality of digital data of the first neural network.

12. The information processing apparatus according to claim 8, wherein said plurality of commands comprise analog data, and wherein said interface unit includes means for converting said analog data to said plurality of digital data.

13. The information processing apparatus according to claim 8, wherein:
    said interface unit includes speech input means for inputting a spoken command; and,
    said first neural network includes means for converting said spoken command to said plurality of digital data.

14. The information processing apparatus according to claim 8, wherein:
    said interface unit includes handwritten command input means for inputting a handwritten command; and,
    said first neural network includes means for converting said handwritten command to said plurality of digital data.

* * * * *

UNITED STATES PATENT AND TRADEMARK OFFICE
CERTIFICATE OF CORRECTION

PATENT NO. : 5,426,745
DATED : June 20, 1995
INVENTOR(S) : Toru Baji, et al.

It is certified that error appears in the above-indentified patent and that said Letters Patent is hereby corrected as shown below:

Claim 1, column 21, line 31, delete "in" and substitute therefor --into--.

Claim 1, column 21, line 32, delete the second occurrence of "an" and substitute therefor --and--.

Signed and Sealed this

Fifth Day of September, 1995

Attest:

BRUCE LEHMAN

Attesting Officer        Commissioner of Patents and Trademarks